United States Patent
De Wind et al.

(10) Patent No.: US 9,580,019 B2
(45) Date of Patent: Feb. 28, 2017

(54) INTERIOR REARVIEW MIRROR ASSEMBLY WITH USER INPUT MODULE

(71) Applicant: Magna Mirrors of America, Inc., Holland, MI (US)

(72) Inventors: Darryl P. De Wind, Holland, MI (US); John T. Uken, Jenison, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 576 days.

(21) Appl. No.: 13/919,491

(22) Filed: Jun. 17, 2013

(65) Prior Publication Data

US 2013/0279147 A1   Oct. 24, 2013

Related U.S. Application Data

(63) Continuation of application No. 12/576,550, filed on Oct. 9, 2009, now Pat. No. 8,465,161.

(60) Provisional application No. 61/187,066, filed on Jun. 15, 2009, provisional application No. 61/105,071, filed on Oct. 14, 2008.

(51) Int. Cl.
*B60R 1/12* (2006.01)

(52) U.S. Cl.
CPC ........ *B60R 1/12* (2013.01); *B60R 2001/1284* (2013.01)

(58) Field of Classification Search
None
See application file for complete search history.

(56) References Cited

U.S. PATENT DOCUMENTS

| | | |
|---|---|---|
| 4,436,371 A | 3/1984 | Wood et al. |
| 4,602,135 A | 7/1986 | Phalen |
| 4,807,096 A | 2/1989 | Skogler et al. |
| 4,826,289 A | 5/1989 | Vandenbrink et al. |
| 4,862,594 A | 9/1989 | Schierbeek et al. |
| 4,936,533 A | 6/1990 | Adams et al. |
| 4,937,945 A | 7/1990 | Schofield et al. |
| 5,066,112 A | 11/1991 | Lynam et al. |
| 5,100,095 A | 3/1992 | Haan et al. |
| 5,131,154 A | 7/1992 | Schierbeek et al. |
| 5,255,442 A | 10/1993 | Schierbeek et al. |
| 5,479,155 A | 12/1995 | Zeinstra et al. |
| 5,523,730 A | 6/1996 | Van Zeeland |
| 5,530,240 A | 6/1996 | Larson et al. |
| 5,550,677 A | 8/1996 | Schofield et al. |
| 5,561,278 A | 10/1996 | Rutten |
| 5,576,687 A | 11/1996 | Blank et al. |
| 5,594,222 A | 1/1997 | Caldwell |

(Continued)

*Primary Examiner* — J Doak

(74) *Attorney, Agent, or Firm* — Gardner, Linn, Burkhart & Flory, LLP

(57) ABSTRACT

An interior rearview mirror assembly for a vehicle includes a reflective element, a housing portion and a user input module. The housing portion is positioned at a perimeter of the reflective element and has an exterior surface that faces generally toward the driver of the vehicle when the interior rearview mirror assembly is normally mounted in the vehicle. The housing portion has a recess established at the exterior surface. The user input module includes at least one user input that is actuatable by a user and includes backlighting operable to backlight the at least one user input. The user input module is at least partially received in the recess at the housing portion and is configured to snap attach at the housing portion when at least partially received in the recess at the housing portion.

20 Claims, 31 Drawing Sheets

(56) References Cited

U.S. PATENT DOCUMENTS

| | | |
|---|---|---|
| 5,632,092 A | 5/1997 | Blank et al. |
| 5,649,756 A | 7/1997 | Adams et al. |
| 5,660,096 A | 8/1997 | Friedrichsen |
| 5,668,663 A | 9/1997 | Varaprasad et al. |
| 5,673,994 A | 10/1997 | Fant, Jr. et al. |
| 5,708,410 A | 1/1998 | Blank et al. |
| 5,724,187 A | 3/1998 | Varaprasad et al. |
| 5,786,772 A | 7/1998 | Schofield et al. |
| 5,796,094 A | 8/1998 | Schofield et al. |
| 5,798,688 A | 8/1998 | Schofield |
| 5,820,097 A | 10/1998 | Spooner |
| 5,820,245 A | 10/1998 | Desmond et al. |
| 5,867,082 A | 2/1999 | Van Zeeland |
| 5,877,897 A | 3/1999 | Schofield et al. |
| 5,878,353 A | 3/1999 | Ul Azam et al. |
| 5,924,212 A | 7/1999 | Domanski |
| 5,929,786 A | 7/1999 | Schofield et al. |
| 5,940,503 A | 8/1999 | Palett et al. |
| 5,967,299 A | 10/1999 | de Richecour et al. |
| 5,971,552 A | 10/1999 | O'Farrell et al. |
| 5,990,772 A | 11/1999 | Van Zeeland |
| 6,000,823 A | 12/1999 | Desmond et al. |
| 6,001,486 A | 12/1999 | Varaprasad et al. |
| 6,023,213 A | 2/2000 | Van Zeeland |
| 6,069,552 A | 5/2000 | Van Zeeland |
| 6,069,945 A | 5/2000 | Brown et al. |
| 6,097,023 A | 8/2000 | Schofield et al. |
| 6,124,886 A | 9/2000 | DeLine et al. |
| 6,137,387 A | 10/2000 | Van Zeeland |
| 6,243,003 B1 | 6/2001 | DeLine et al. |
| 6,250,148 B1 | 6/2001 | Lynam |
| 6,262,646 B1 | 7/2001 | Van Zeeland |
| 6,262,831 B1 | 7/2001 | Bauer et al. |
| 6,278,377 B1 | 8/2001 | DeLine et al. |
| 6,310,611 B1 | 10/2001 | Caldwell |
| 6,313,454 B1 | 11/2001 | Bos et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,341,523 B2 | 1/2002 | Lynam |
| 6,346,698 B1 | 2/2002 | Turnbull |
| 6,353,392 B1 | 3/2002 | Schofield et al. |
| 6,362,771 B1 | 3/2002 | Schofield et al. |
| 6,369,804 B1 | 4/2002 | Sandbach |
| 6,386,742 B1 | 5/2002 | DeLine et al. |
| 6,396,408 B2 | 5/2002 | Drummond et al. |
| 6,420,975 B1 | 7/2002 | DeLine et al. |
| 6,428,172 B1 | 8/2002 | Hutzel et al. |
| 6,437,258 B1 | 8/2002 | Sandbach |
| 6,439,755 B1 | 8/2002 | Fant, Jr. et al. |
| 6,452,479 B1 | 9/2002 | Sandbach |
| 6,471,362 B1 | 10/2002 | Carter et al. |
| 6,477,464 B2 | 11/2002 | McCarthy et al. |
| 6,492,980 B2 | 12/2002 | Sandbach |
| 6,501,387 B2 | 12/2002 | Skiver et al. |
| 6,501,465 B2 | 12/2002 | Sandbach |
| 6,504,531 B1 | 1/2003 | Sandbach |
| 6,522,451 B1 | 2/2003 | Lynam |
| 6,593,565 B2 | 7/2003 | Heslin et al. |
| 6,614,241 B2 | 9/2003 | Schmitt et al. |
| 6,627,918 B2 | 9/2003 | Getz et al. |
| 6,648,477 B2 | 11/2003 | Hutzel et al. |
| 6,672,744 B2 | 1/2004 | Deline et al. |
| 6,678,614 B2 | 1/2004 | McCarthy et al. |
| 6,690,268 B2 | 2/2004 | Schofield et al. |
| 6,714,331 B2 | 3/2004 | Lewis et al. |
| 6,756,912 B2 | 6/2004 | Skiver et al. |
| 6,762,867 B2 | 7/2004 | Lippert et al. |
| 6,795,221 B1 | 9/2004 | Urey |
| 6,824,281 B2 | 11/2004 | Schofield et al. |
| 6,847,487 B2 | 1/2005 | Burgner |
| 6,870,655 B1 | 3/2005 | Northman et al. |
| 6,870,656 B2 | 3/2005 | Tonar et al. |
| 6,877,888 B2 | 4/2005 | Deline et al. |
| 6,882,287 B2 | 4/2005 | Schofield |
| 6,946,978 B2 | 9/2005 | Schofield |
| 6,967,299 B2 | 11/2005 | Howie et al. |
| 7,004,593 B2 | 2/2006 | Weller et al. |
| 7,023,322 B2 | 4/2006 | Baumgardner et al. |
| 7,023,379 B2 | 4/2006 | Turnbull |
| 7,038,577 B2 | 5/2006 | Pawlicki et al. |
| 7,075,511 B1 | 7/2006 | Mousseau et al. |
| 7,158,881 B2 | 1/2007 | McCarthy et al. |
| 7,167,796 B2 | 1/2007 | Taylor et al. |
| 7,184,190 B2 | 2/2007 | McCabe et al. |
| 7,195,381 B2 | 3/2007 | Lynam et al. |
| 7,221,363 B2 | 5/2007 | Roberts et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,289,037 B2 | 10/2007 | Uken et al. |
| 7,308,341 B2 | 12/2007 | Schofield et al. |
| 7,338,177 B2 | 3/2008 | Lynam |
| 7,360,932 B2 | 4/2008 | Uken et al. |
| 7,420,756 B2 | 9/2008 | Lynam |
| 7,446,924 B2 | 11/2008 | Schofield et al. |
| 7,527,403 B2 | 5/2009 | Uken |
| 7,626,749 B2 | 12/2009 | Baur et al. |
| 7,657,052 B2 | 2/2010 | Larson et al. |
| 7,683,768 B2 | 3/2010 | Lindahl et al. |
| 7,690,824 B2 | 4/2010 | Uken et al. |
| 8,465,161 B2 | 6/2013 | De Wind et al. |
| 2006/0050018 A1 | 3/2006 | Hutzel et al. |
| 2006/0061008 A1 | 3/2006 | Karner et al. |

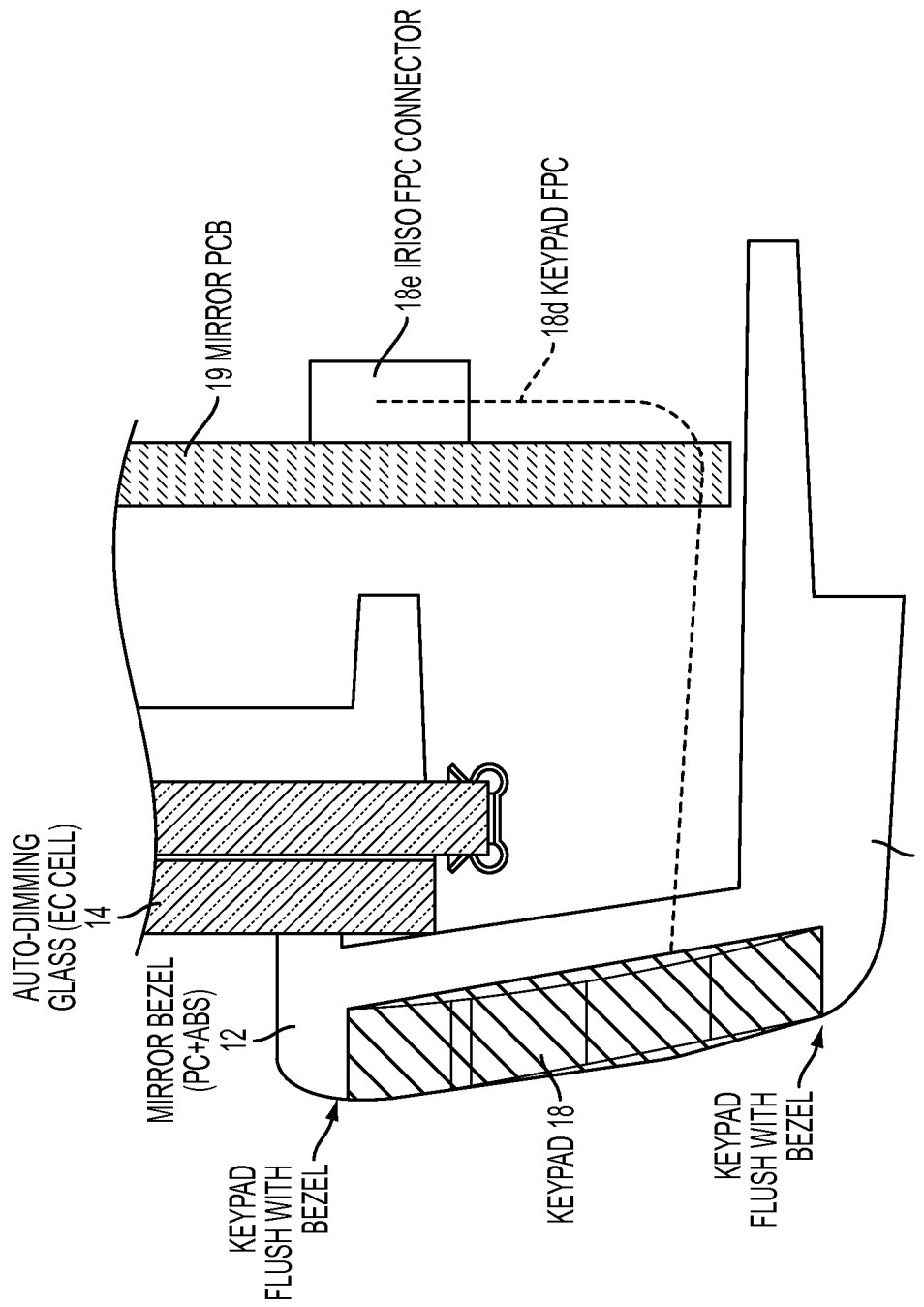

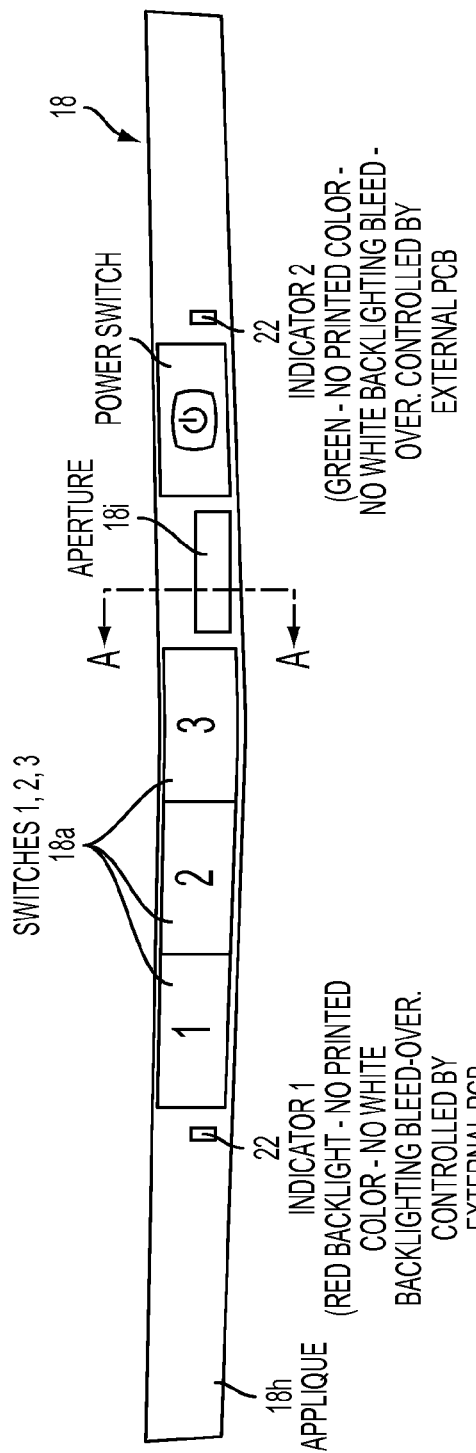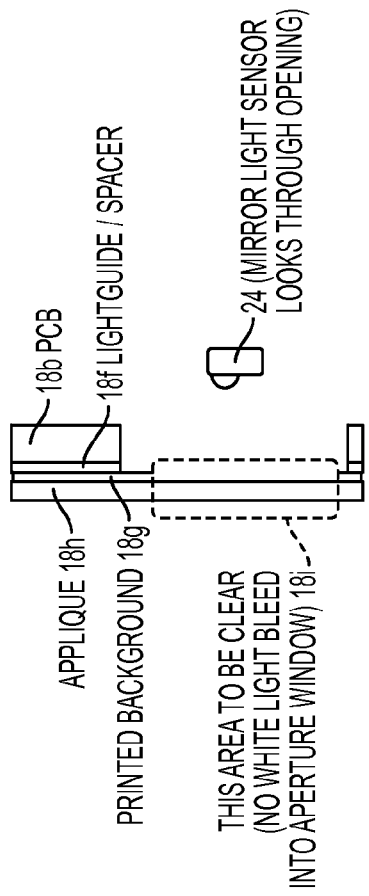

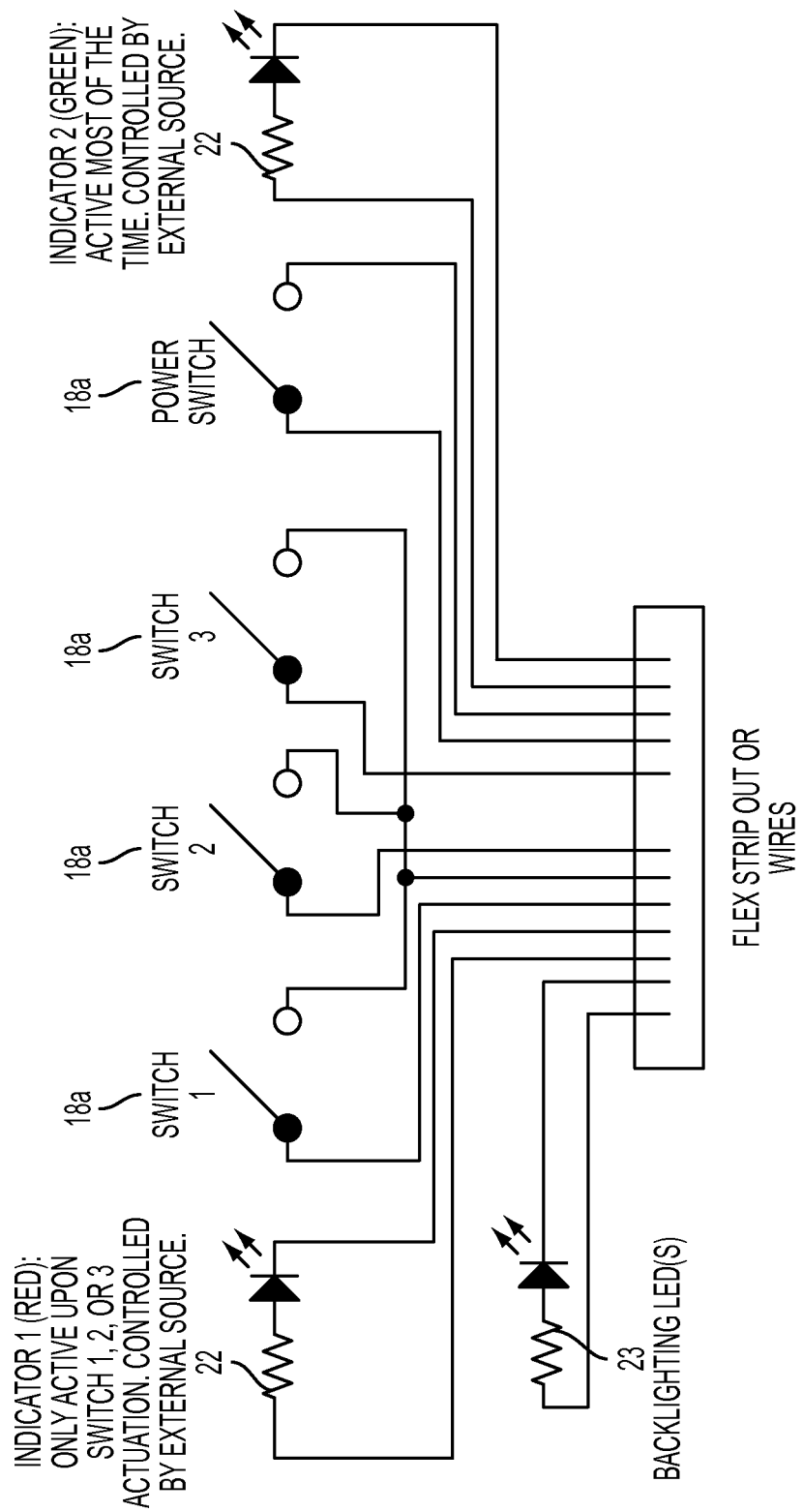

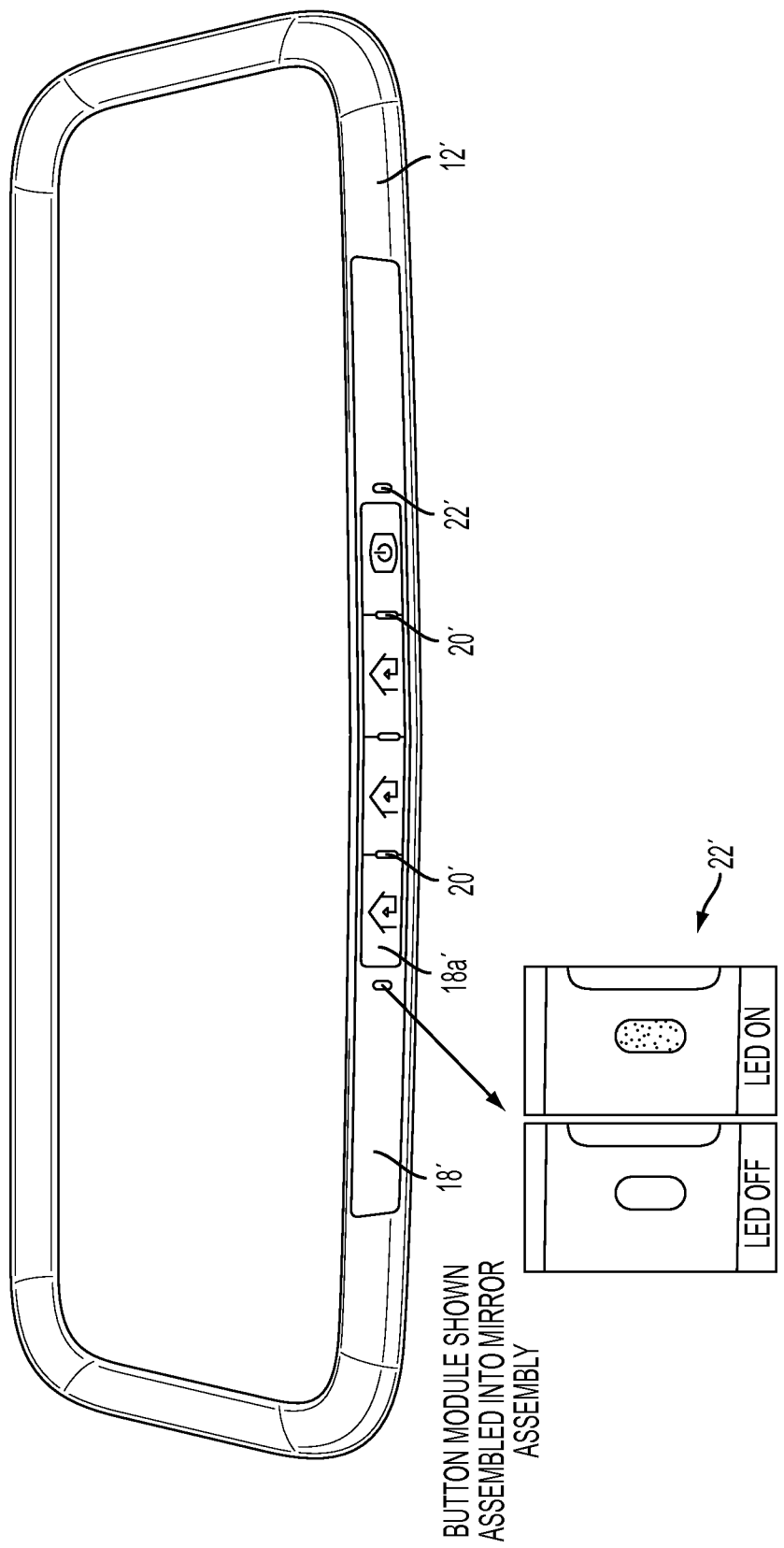

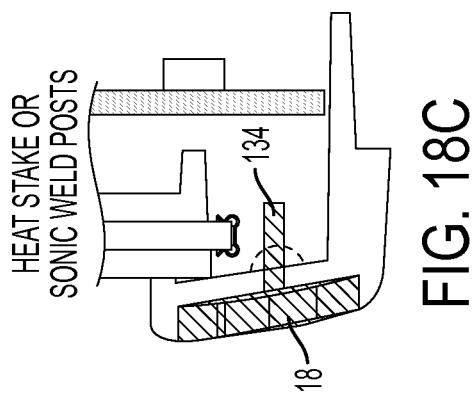
FIG. 18C HEAT STAKE OR SONIC WELD POSTS
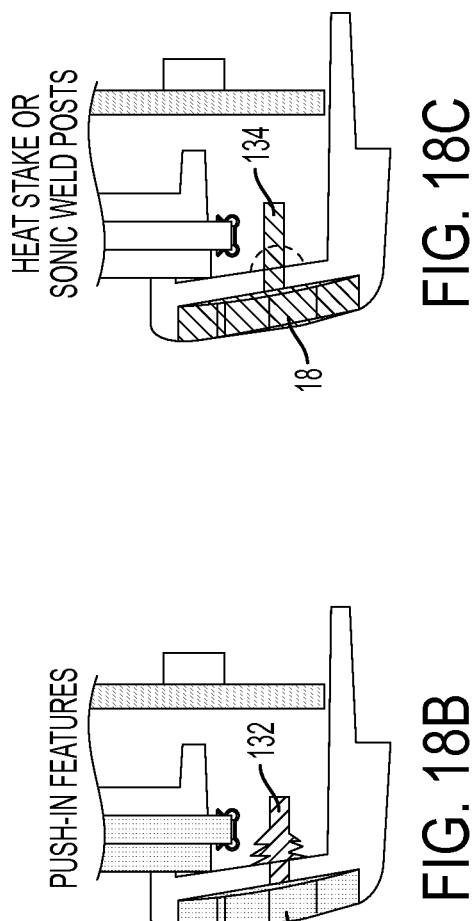
FIG. 18B PUSH-IN FEATURES
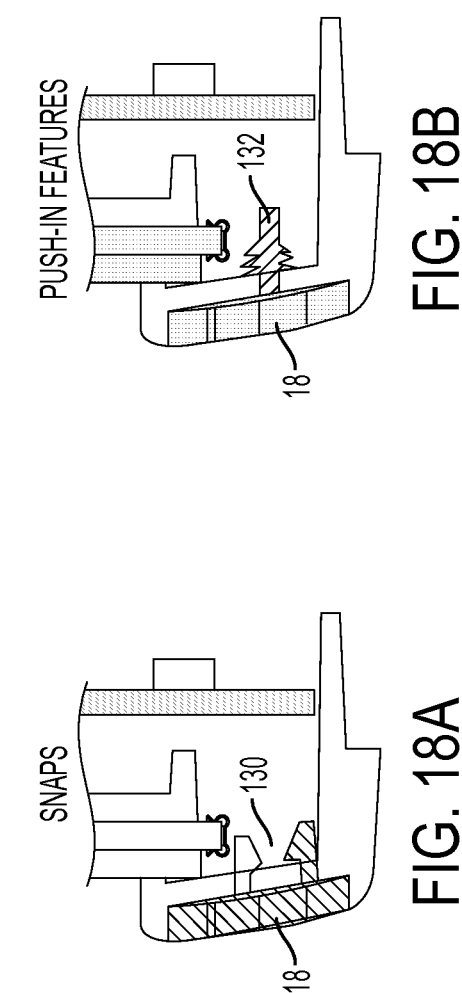
FIG. 18A SNAPS
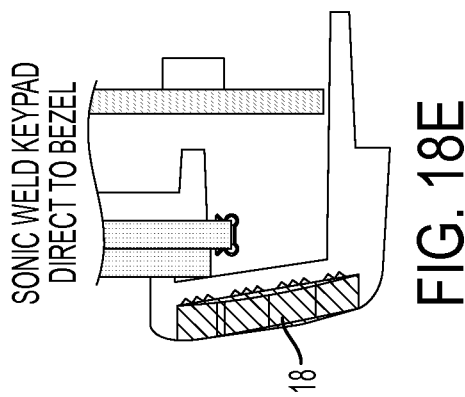
FIG. 18E SONIC WELD KEYPAD DIRECT TO BEZEL
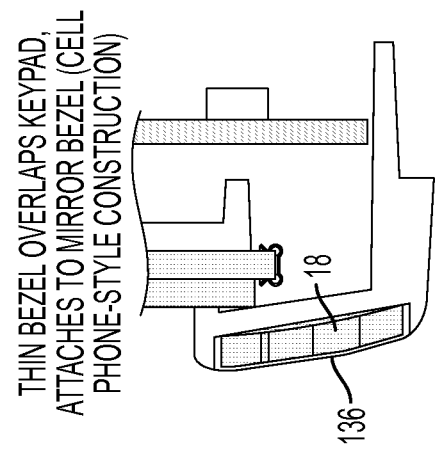
FIG. 18D THIN BEZEL OVERLAPS KEYPAD, ATTACHES TO MIRROR BEZEL (CELL PHONE-STYLE CONSTRUCTION)

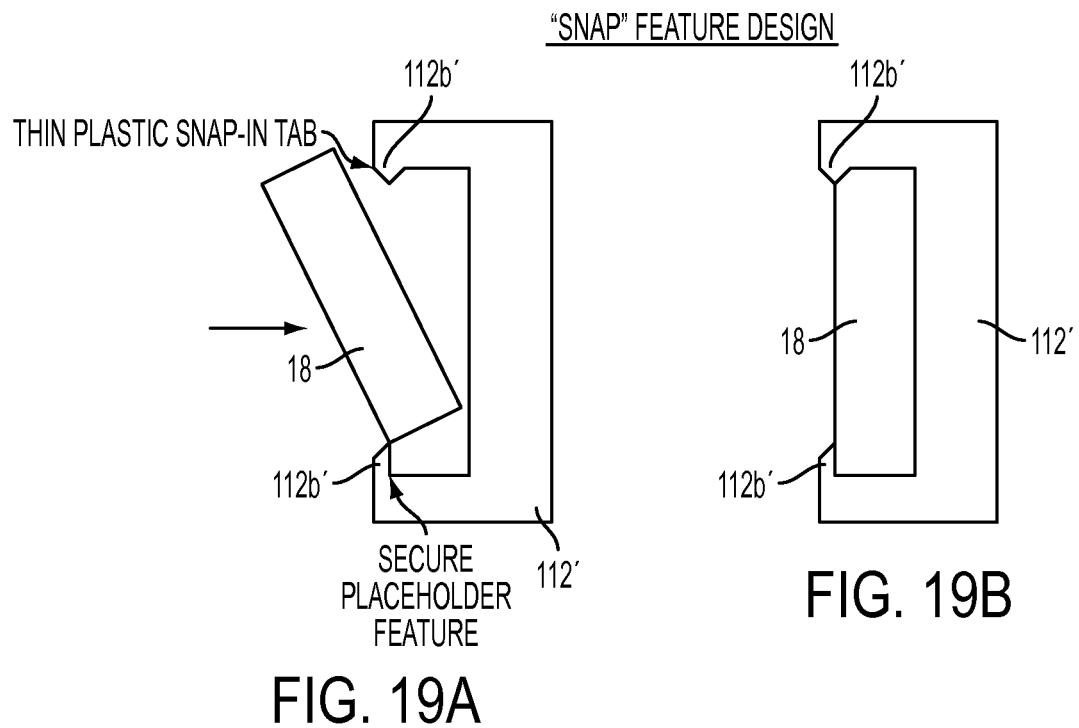

INTERIOR REARVIEW MIRROR ASSEMBLY WITH USER INPUT MODULE

CROSS REFERENCE TO RELATED APPLICATIONS

The present invention application is a continuation of U.S. patent application, Ser. No. 12/576,550, filed Oct. 12, 2009, now U.S. Pat. No. 8,465,161, which claims benefit of U.S. provisional applications, Ser. No. 61/187,066, filed Jun. 15, 2009; and Ser. No. 61/105,071, filed Oct. 14, 2008, which are hereby incorporated herein by reference in their entireties.

FIELD OF THE INVENTION

The present invention relates generally to the field of interior rearview mirror assemblies for vehicles and, more particularly, to interior rearview mirror assemblies which incorporate an accessory or feature, particularly an electronic accessory or feature.

BACKGROUND OF THE INVENTION

It is often desirable to provide an electronic feature in or at a vehicular interior rearview mirror assembly, such as a trainable garage door opener, a compass sensor and/or compass display, a tire pressure monitoring system receiver and/or display and/or the like, often along with the user inputs or buttons or switches associated with such systems and/or displays. The buttons may comprise manual push buttons positioned along a lower chin portion of the bezel or casing of the mirror assembly or may be touch or proximity-sensing sensors. For example, and as disclosed in U.S. Pat. No. 6,471,362, which is hereby incorporated herein by reference, the buttons may be positioned at a chin portion of the bezel, such as within an opening in the chin portion of the bezel. While such an approach has achieved limited commercial success, there are shortcomings with the likes of such three-sided openings in bezels.

Therefore, there is a need in the art for an improved mirror assembly which overcomes the shortcomings of the prior art.

SUMMARY OF THE INVENTION

The present invention provides an interior rearview mirror assembly which has a bezel or bezel portion that extends at least partially around a perimeter of a reflective element and has at least one recess or module mounting location established at a portion of the bezel, such as at a lower portion or chin portion of the bezel. A button module or user input module having one or more user inputs or buttons is disposed at the mirror assembly at the recess.

According to an aspect of the present invention, an interior rearview mirror assembly for a vehicle comprises a reflective element, a bezel portion is positioned around the perimeter of the reflective element, and an input module or button module disposed at an opening or aperture or recess or mounting location formed or established at the bezel portion. The input module includes one or more user inputs or buttons that are movable or actuatable by a user to engage and actuate an electronic switch or circuitry of the input module. The circuitry of the input module is in communication with circuitry of the mirror assembly and/or of the vehicle.

The input module may comprise a low profile input module that is received at least partially in a recess established along the bezel portion. Optionally, the recess may be formed at the face of the bezel portion and not entirely through the bezel portion, such that the input module may be at least partially received in the recess with its rear surface attached to or adhered to a surface of the recess. The bezel portion may include an aperture established entirely through the bezel portion and at a portion encompassed by the recess for providing a passageway for electrical wires or an electrical lead of the input module, in order to electrically connect circuitry of the input module with circuitry of the mirror assembly or vehicle.

These and other objects, advantages, purposes and features of the present invention will become apparent upon review of the following specification in conjunction with the drawings.

BRIEF DESCRIPTION OF THE DRAWINGS

FIG. 6A is an enlarged sectional view of the button region of the mirror assembly of the present invention, shown with a flexible ribbon cable for electrically connecting the user input module to a mirror circuit board of the mirror assembly;

FIG. 8 is a front elevation of the user input module of the present invention;

FIG. 9 is a sectional view taken along the line A-A in FIG. 8;

FIGS. 10 and 10A are electrical schematics of a user input module of the present invention;

FIG. 11A is a front elevation of another interior rearview mirror assembly in accordance with the present invention;

FIGS. 18A-E are sectional views of the button region of mirror assemblies of the present invention, showing different exemplary means for attaching the user input module at the bezel portion of the mirror assembly;

FIGS. 19A and 19B are sectional views of the button region of a mirror assembly of the present invention, showing a snap-in design for retaining the user input module at the bezel portion of the mirror assembly;

DESCRIPTION OF THE PREFERRED EMBODIMENTS

Figure 1:
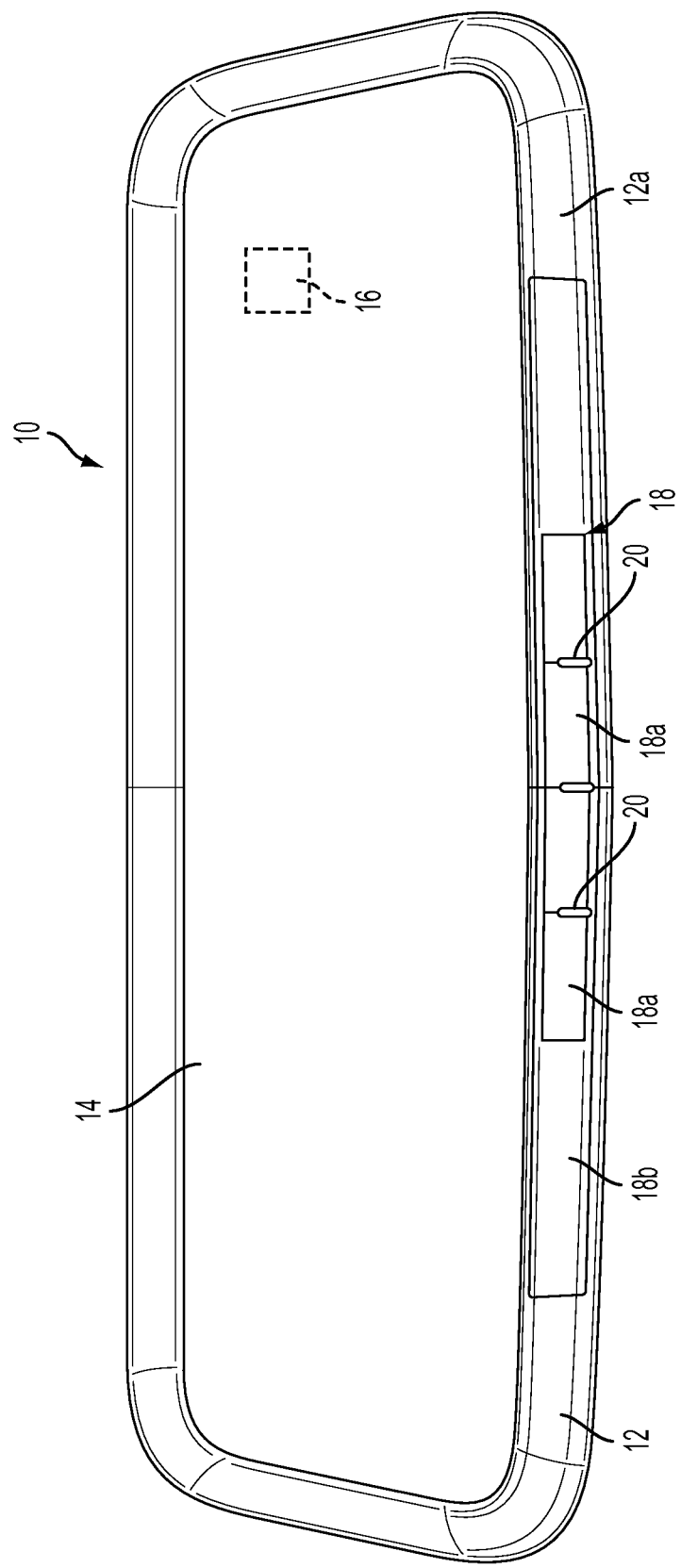
FIG. 1 is a front elevation of an interior rearview mirror assembly having a user input module in accordance with the present invention.
Figure 2:
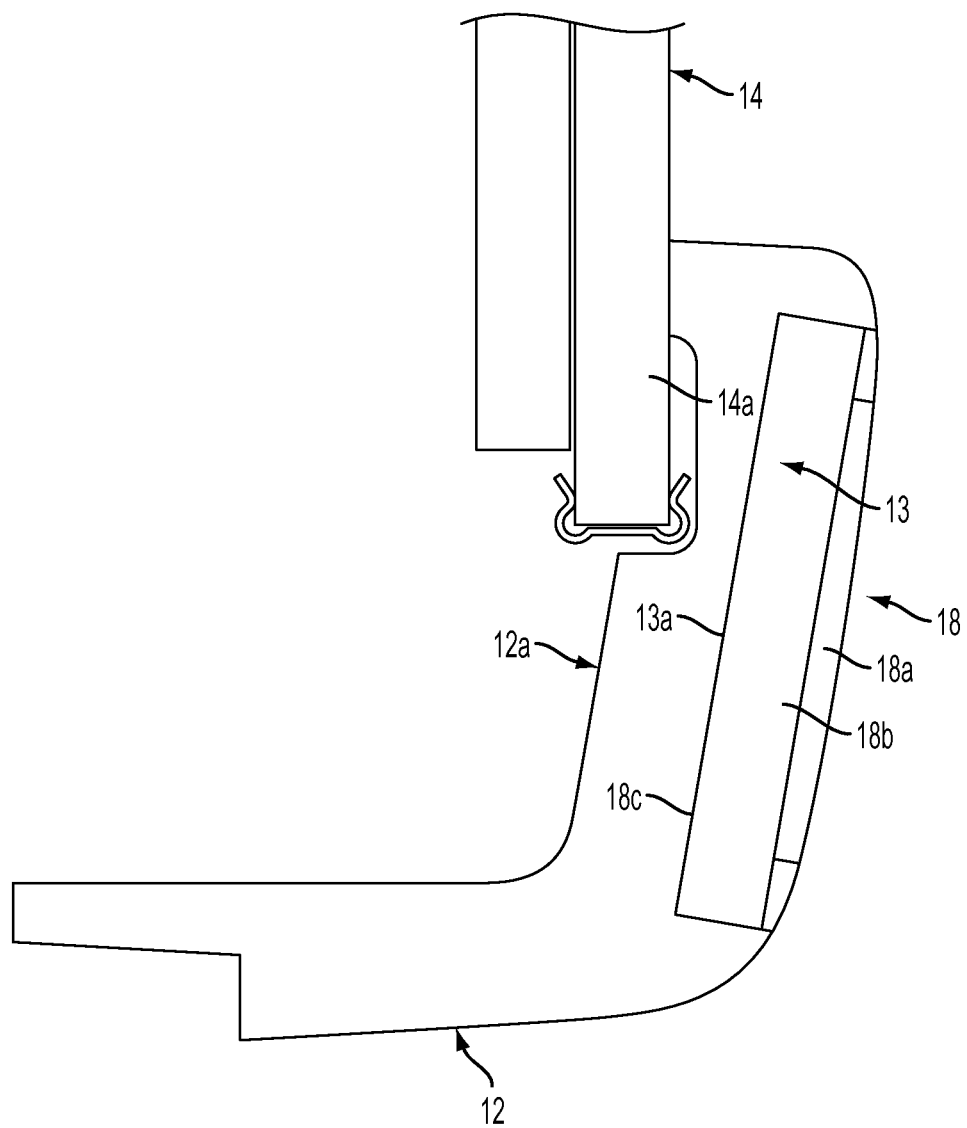
FIG. 2 is an enlarged sectional view of a button region of the mirror assembly of FIG. 1.
Figure 3:
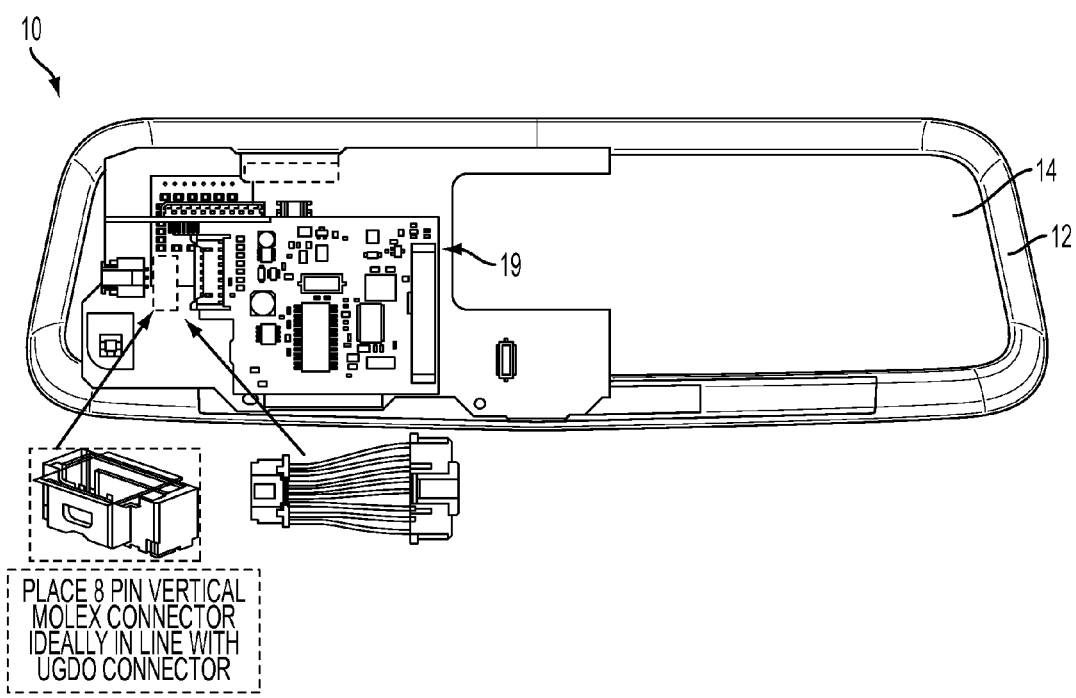
FIG. 3 is a rear elevation of bezel and reflective element sub-assembly of the mirror assembly of FIG. 1.
Figure 4:
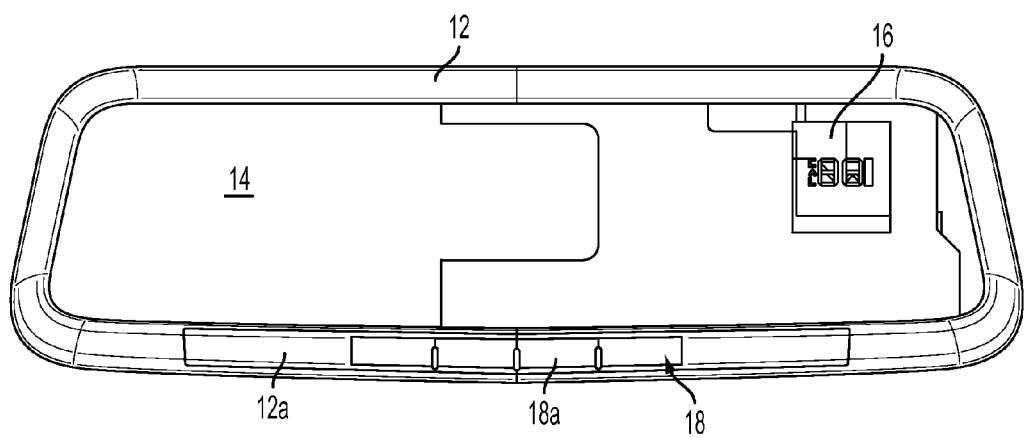
FIG. 4 is a front elevation of the bezel and reflective element sub-assembly of FIG. 3.

Referring now to the drawings and the illustrative embodiments depicted therein, an interior rearview mirror assembly 10 for a vehicle includes a bezel portion 12 and a mirror reflective element 14 positioned at the bezel portion (FIGS. 1 and 2). Mirror assembly 10 includes or is associated with an electronic accessory or device or circuitry or display 16, and includes a user input module 18 disposed along a perimeter region of the reflective element 14. User input module 18 includes one or more user inputs or buttons or switches 18a for activating/deactivating and/or controlling the electronic accessory. User input module 18 may be positioned along the perimeter region of the reflective element, such as along a lower perimeter region of the reflective element, and is disposed at or at least partially in a recess or pocket 13 formed or established at the lower perimeter region or chin portion 12a of the bezel portion 12, as discussed below. Optionally, and as can be seen with reference to FIG. 2, the user input module 18 may be disposed at a portion of the bezel portion such that at least a portion of the user input module is at or above a lower perimeter region or lower edge region 14a of reflective element 14. Thus, the user input module may provide larger user inputs or buttons at the lower perimeter region of the bezel portion and reflective element, as also discussed below. Although shown and described as being at a lower perimeter or chin region of the bezel portion, clearly the recess or pocket and user input module may be established or disposed elsewhere at the mirror, such as at an upper perimeter or brow region of the bezel portion or a side or end region of the bezel portion or the like, while remaining within the spirit and scope of the present invention. The user input module may extend along the bezel portion and may extend a desired or selected length along the bezel portion. Optionally, the user input module may encompass a substantial portion of the bezel portion (such as the lower portion or chin region and one or both side regions of the bezel portion) or may encompass the entire bezel portion or periphery of the reflective element, depending on the particular application of the user input module and mirror assembly.

User input module 18 comprises one or more user inputs or buttons 18a (such as the four user inputs or buttons shown in FIG. 1) disposed along a body portion or circuitry element 18b of user input module. The body portion or circuitry element 18b may comprise a printed circuit board or flexible circuit board or the like, and may provide for electrical connection with the user inputs and with circuitry 19 within the mirror assembly. The user input module 18 thus may comprise a thin module that provides one or more user inputs or buttons on a substrate or circuitry element, with the circuitry element providing for electrical connection between the user inputs and associated circuitry within the mirror casing.

Figure 16:
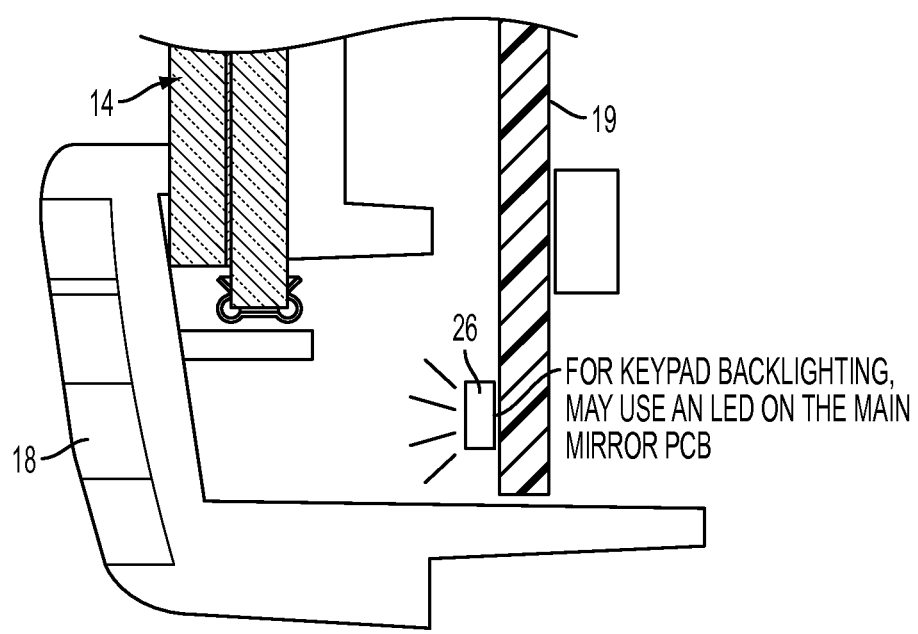
FIG. 16 is an enlarged sectional view of the button region of another mirror assembly of the present invention, shown with a backlighting element for backlighting the keypad element or user input module.

Optionally, for example, the user inputs may comprise a polyform keypad or the like that includes a flexible top or outer strip or thin substrate (with the user inputs established or demarcated thereon) that is disposed over and/or adhered to a circuitry element or the like that includes the actuating circuitry that is actuated by a user touching or depressing the appropriate user input or location along the flexible strip. Optionally, the circuitry element may include one or more illumination sources, such as a light emitting diode or an electroluminescent foil or light guiding sheet or the like, for backlighting one or more of the user inputs. Optionally, for example, and with reference to FIG. 16, the mirror assembly may include an illumination source 26 may be disposed in the mirror assembly and behind the bezel portion 12. The illumination source 26 (such as a light emitting diode or the like disposed on the mirror circuit board 19) may emit light to backlight the user input module to enhance viewability of the user inputs in low lighting conditions. In such an application, the bezel portion (such as at the region of the recess where the user input module is disposed) may comprise a thin walled section or may be translucent or may have apertures established therethrough to allow for light emitted by the illumination source to pass through the bezel portion to backlight the user input module. The user input module may be relatively thin (such as having a thickness of about 3 mm or less, and preferably having a thickness on the order of about 2 mm) and lightweight and may be readily established at the shallow recess of the bezel portion of the mirror assembly. Such a keypad or user input module may utilize aspects of polyform keypads of the likes that are currently used in cellular telephones, and such as are commercially available from Abatek Group of Norcross, Ga.

In the illustrated embodiment, and as shown in FIG. 9, user input module includes the circuitry element or circuit board 18b, with a light guide or spacer 18f established at the circuit board and with a printed background layer 18g established over the light guide/spacer 18f. An outer cover layer or appliqué 18h is established over the printed background layer 18g, and may define or provide an aperture or window 18i at a photosensor 22, such as discussed below. The cover layer or appliqué may provide the desired exterior finish or appearance to the user input module and may be selected depending on the particular mirror assembly or interior design scheme of the vehicle or customer desired appearance or the like.

The circuitry element 18*b* of user input module 18 is formed to be received in and along the recess 13 established at the front surface or face of the bezel portion 12. The circuitry element 18*b* may be retained or secured in recess 13 via any suitable means, such as, for example, an adhesive or tape or the like disposed between a rear surface 18*c* of circuitry element 18*b* and a front surface 13*a* of recess 13 (the surface within the recess that would face generally toward the driver of the vehicle when the mirror assembly is normally mounted in the vehicle). The user input module 18 may be loaded into or installed at or snapped or adhered into the recess 13 from the front of the mirror assembly (and optionally the electrical connection to circuitry of the mirror assembly may be mechanically and electrically made as the user input module is inserted into and received into the recess of the bezel portion), or may be loaded from the rear of the bezel portion (such as before the bezel portion is attached to the rear mirror casing), while remaining within the spirit and scope of the present invention.

Figure 13:
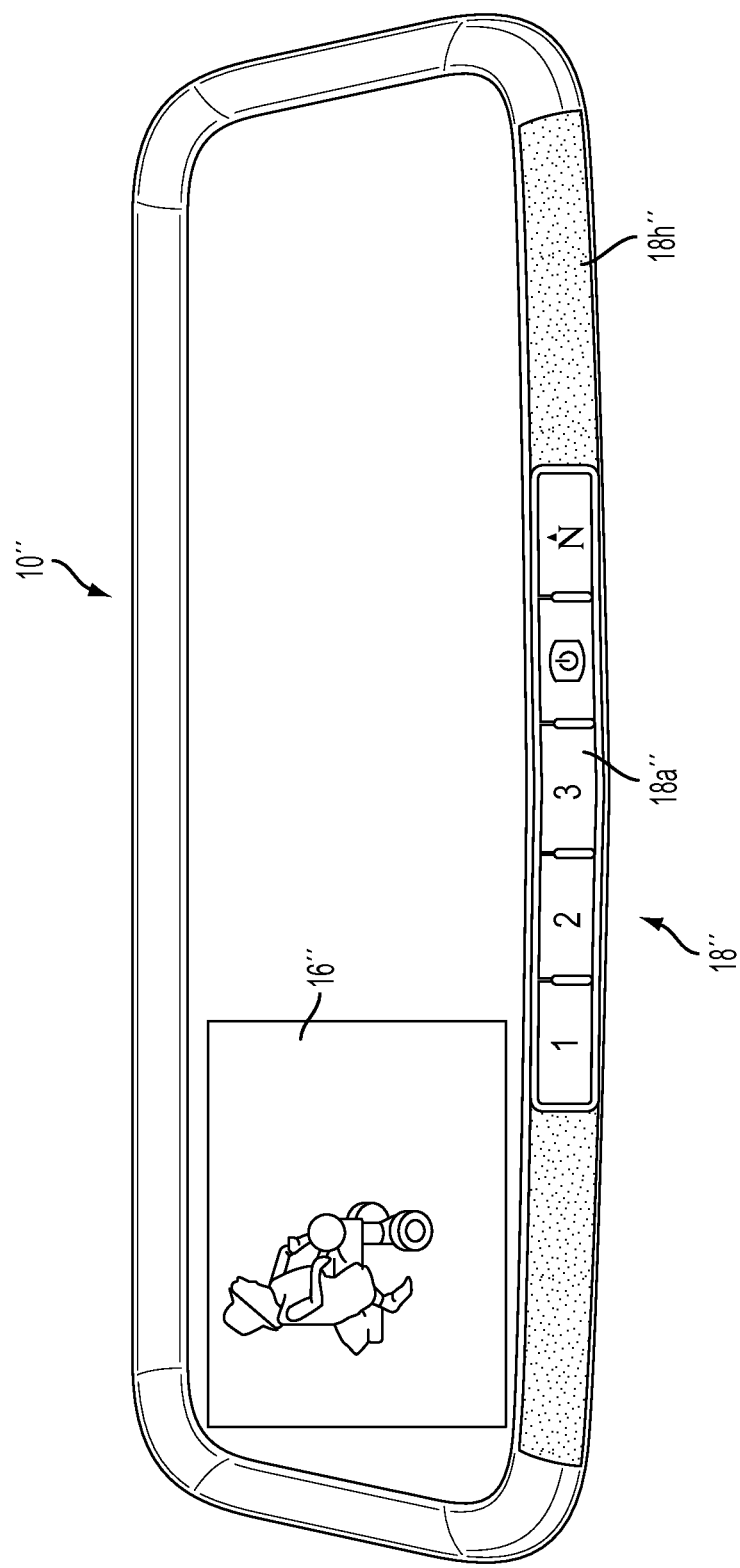
FIG. 13 is a front elevation of another interior rearview mirror assembly in accordance with the present invention.

As shown in FIG. 2, recess 13 may be established partially into the front surface 12*a* of bezel portion 12, and may overlap the lower perimeter region 14*a* of reflective element 14. The user input module 18 may be at least partially received within the recess 13 (with its rear surface 18*c* contacting or attaching to the front surface 13*a* of recess 13) and may be disposed at the bezel portion with a portion of the user input module disposed at or over or above the lower perimeter 14*a* of reflective element 14. Thus, the user input module 18 may provide a greater button size to bezel size ratio for a given bezel height dimension, and thus may provide relatively large user inputs 18*a* at the bezel portion that may extend over or encompass an adjacent portion of the reflective element, such that the larger user inputs 18*a* may be provided at a bezel portion that need not be correspondingly enlarged (since the bezel portion need not extend substantially below the corresponding perimeter edge of the reflective element to provide space for the user inputs). Also, such a user input module may be suitable for use in mirror assembly applications where the mirror assembly includes a video display, since the user input module may be disposed at the lower region of the reflective element and thus over or in front of a lower portion of a display module, without requiring clearance behind the user inputs that is typically required for conventional user inputs or buttons. For example, and as shown in FIG. 13, a user input module 18″ may be disposed at a mirror assembly 10″ that has a video display screen or device or module 16″, with the video display screen being disposed partially above and partially behind the user input module.

Figure 5:
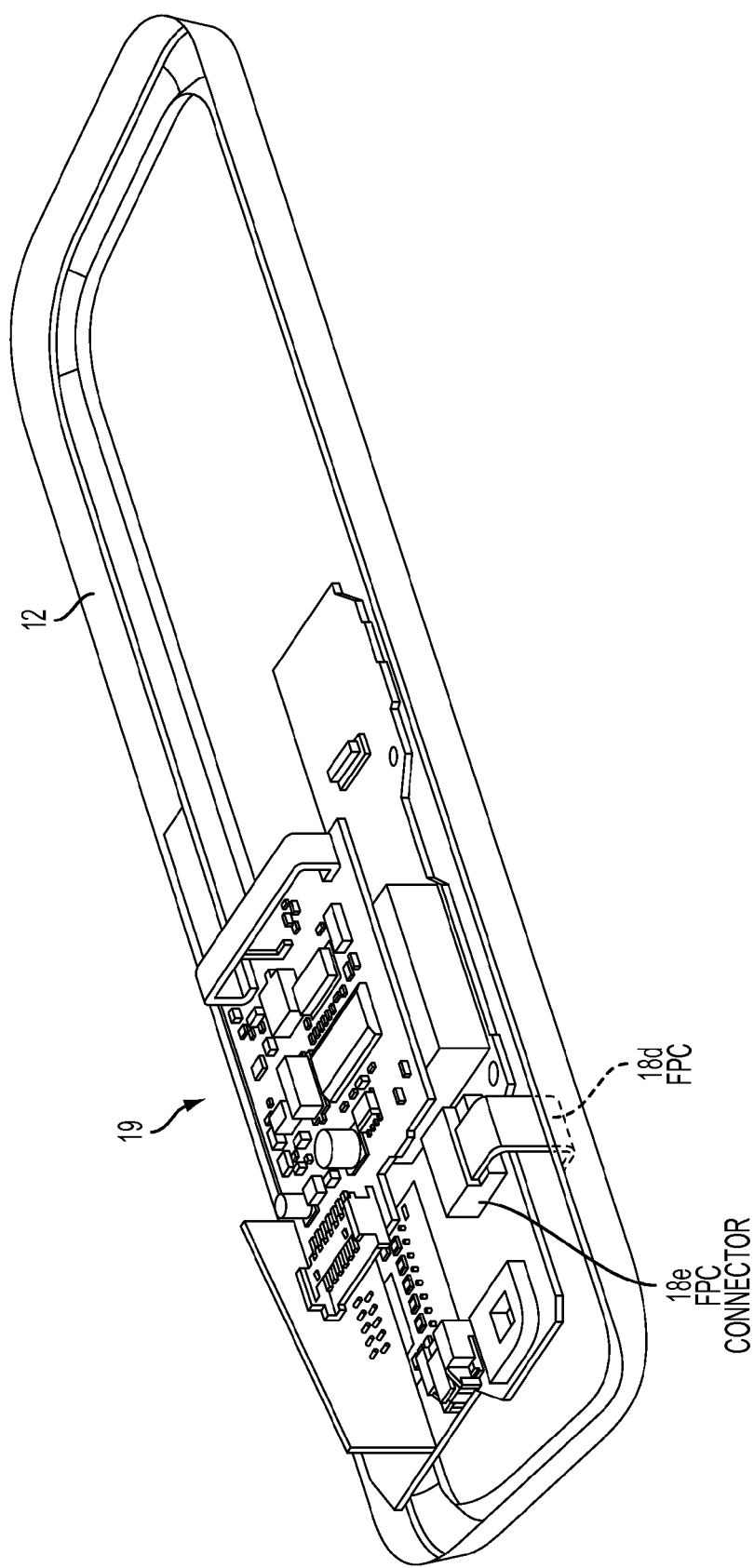
FIG. 5 is a perspective view of the bezel and reflective element sub-assembly of FIGS. 3 and 4.
Figure 6:
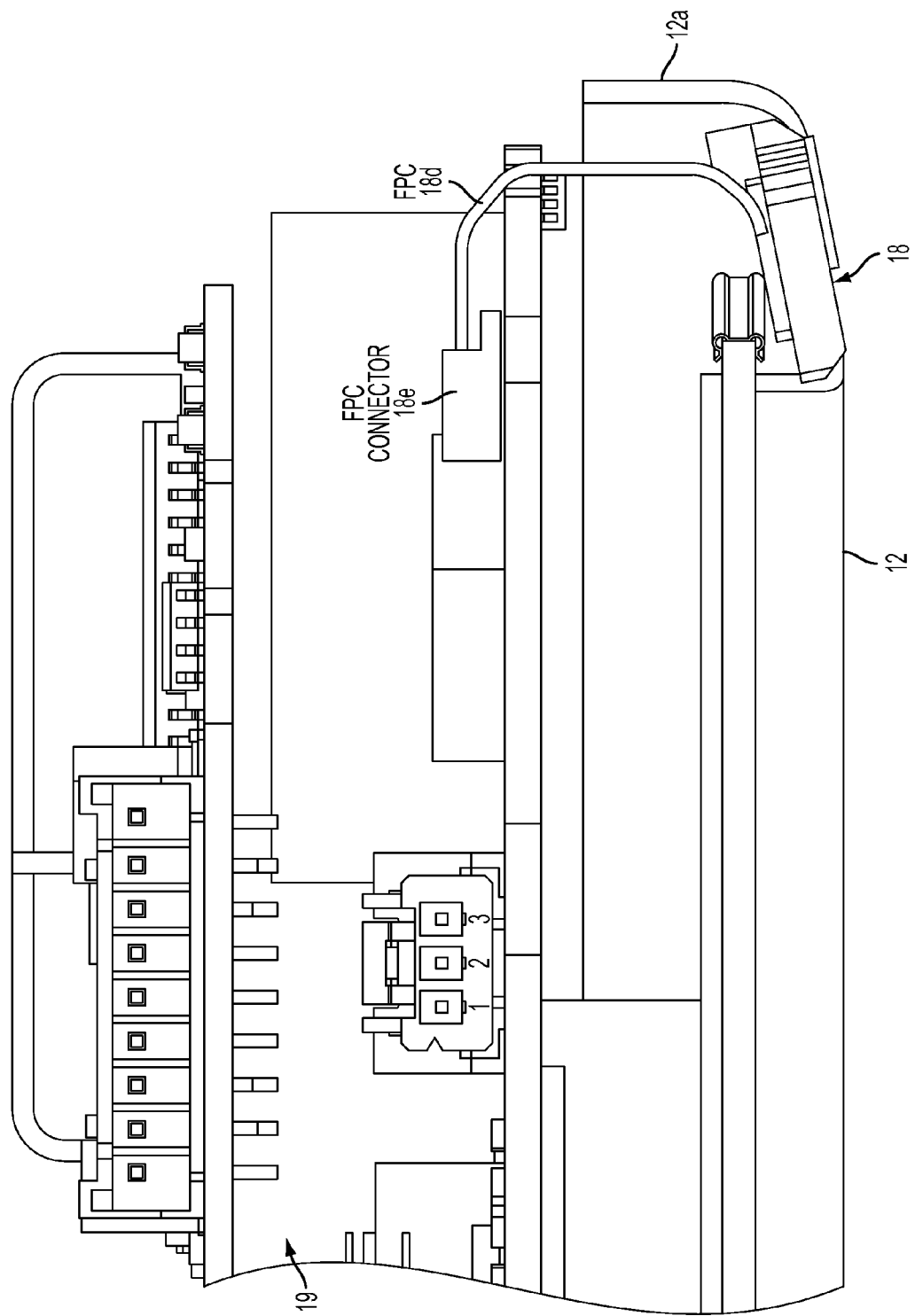
FIG. 6 is a sectional view of the bezel and reflective element sub-assembly of FIGS. 3-5.
Figure 7:
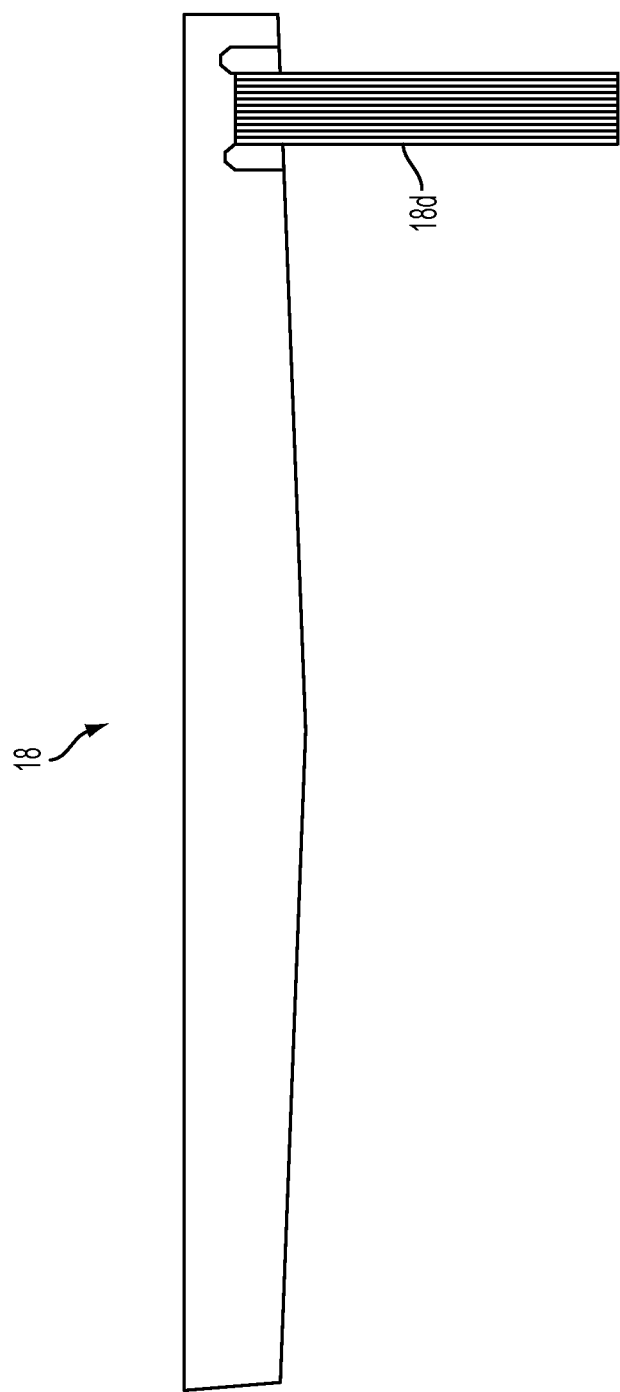
FIG. 7 is a plan view of a user input module of the present invention.

As shown in FIGS. 5-7, user input module 18 includes an electrical connector 18*d* for electrically connecting user inputs 18*a* to electronic circuitry 19 of the mirror assembly, such as a printed circuit board or the like within the mirror casing of mirror assembly 10 or such as a wiring harness or lead at or in the mirror assembly that extends or connects to a wiring harness of the vehicle. Electrical connector 18*d* (such as a ribbon cable or the like) extends from body or circuitry element 18*b* of user input module, whereby the electrical connector (which may have a plurality of wires and a multi-pin plug or socket type connector 18*e* at an end thereof) may be plugged into or otherwise readily connected to the mirror circuitry or mirror circuit board 19 or vehicle circuitry or the like. As shown in FIGS. 6 and 6A, electrical connector or flexible ribbon cable 18*d* may pass through bezel portion 12 and below the proximate perimeter edge region of the reflective element 14, while a portion of the user input module 18 may overlap or encompass the proximate perimeter region of the reflective element, such as in a similar manner as described above. In the illustrated embodiment, and as shown in FIG. 7, the flexible cable or connector may extend from an end region of the user input module; however, it is envisioned that the flexible cable or connector may extend from anywhere along the user input module and may pass through the bezel portion at any location along bezel portion (such as anywhere along or at the recess of the bezel portion and behind the user input module when the user input module is attached thereto), depending on the particular application of the user input module and mirror assembly, while remaining within the spirit and scope of the present invention.

Optionally, the user inputs may comprise elongated button portions that have outer curved surfaces that generally or substantially correspond to the shape of the bezel portion along the respective perimeter region of the reflective element. In the illustrated embodiment, the user input module 18 is disposed at a lower or chin region of the bezel portion and encompasses or overlaps the lower perimeter edge region of the reflective element 14, with the outer surfaces of the input module and inputs or buttons generally conforming with the outer contours of the bezel portion. Optionally, the user input module may be attached to a mounting location along the bezel portion that does not have a recess, whereby the thin user input module may be adhered or attached directly to the outer surface of the bezel portion. In such an application, the perimeter regions of the user input module may be tapered to provide a substantially smooth transition between the bezel portion and the user input module at the perimeter regions of the user input module.

Figure 14:
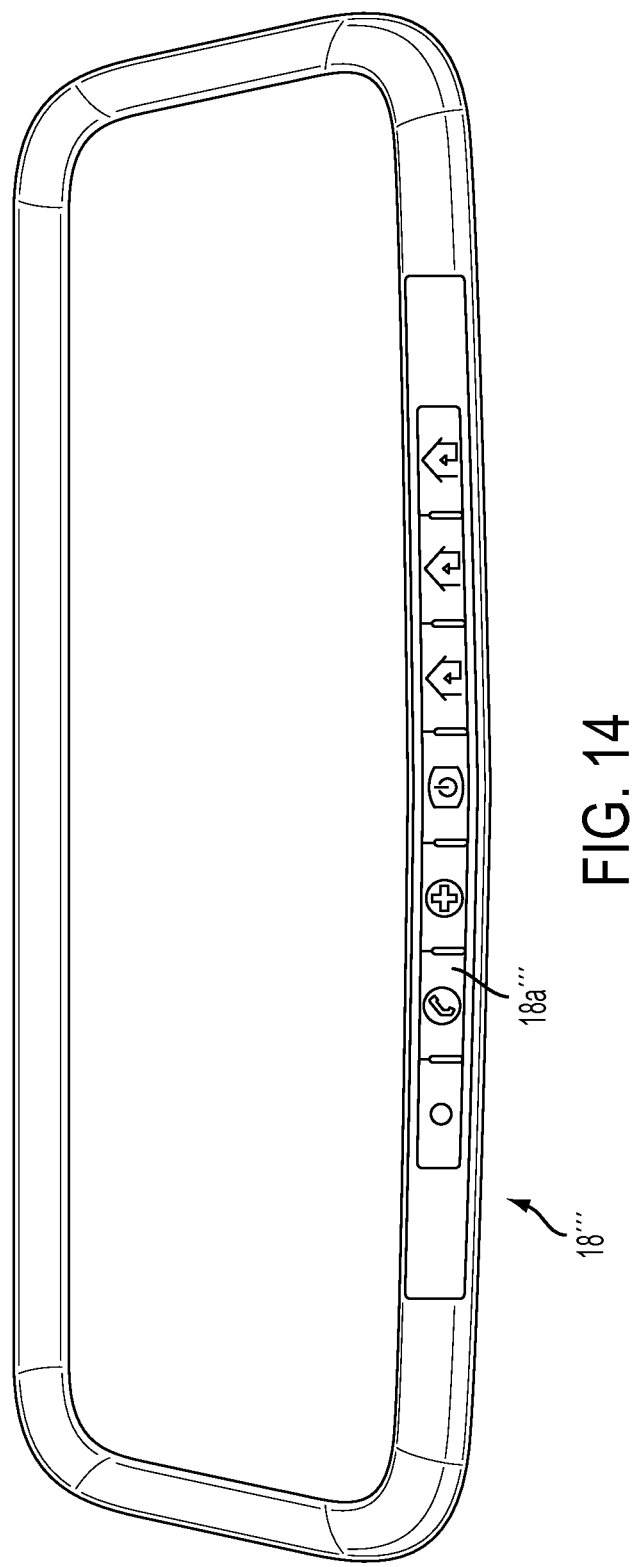
FIG. 14 is a front elevation of another interior rearview mirror assembly in accordance with the present invention.

Optionally, the recess 13 may be established at bezel portion 12 so as to extend substantially along the bezel portion (such as substantially along the chin region of the bezel portion). Thus, a user input module may be selected that has the desired number of user inputs (with appropriate markings or icons established thereat for the corresponding functions of the user input module) for that particular application. For applications with enhanced mirror content, the user input module may include a plurality of user inputs disposed along the body portion of the user input module, while for applications with less or reduced mirror content, the user input module may include fewer inputs disposed along the body portion, with the body portion of the user input module having other surface characteristics at the areas where user inputs are not disposed. Thus, various user input modules may be provided for a particular bezel and recess design, with the particular user input module being selected depending on the number of inputs desired and particular application of the user input module and mirror assembly. For example, and with reference to FIG. 14, a user input module 18‴ may have seven (or more or less) user inputs or buttons 18*a*‴ disposed along the user input module, such as for controlling a telematics system and a universal garage door opener and/or the like (the user input module and inputs or buttons may be selected to have the desired or appropriate printing or icons established at the buttons depending on the particular application of the user input module and the content of the mirror assembly).

Figure 15:
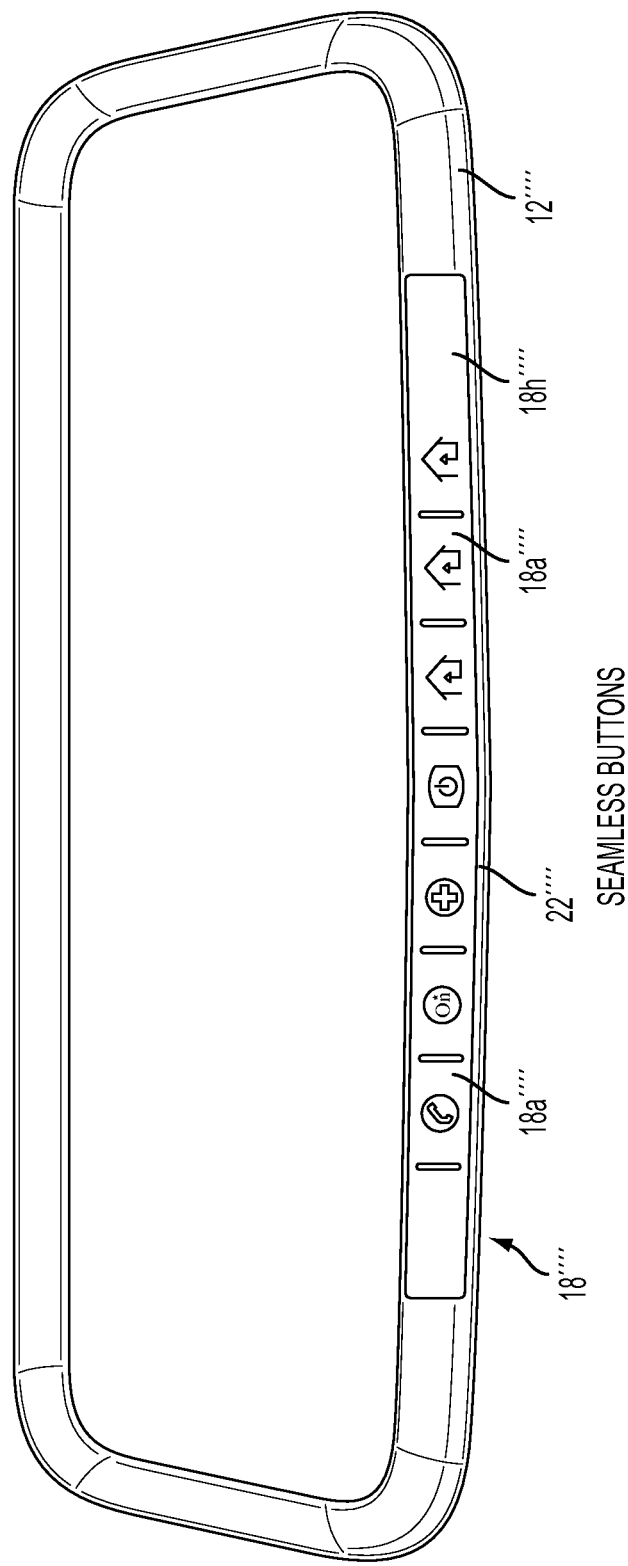
FIG. 15 is a front elevation of another interior rearview mirror assembly in accordance with the present invention.

Optionally, the adjacent inputs or buttons 18*a* of the user input module 18 may be separated by a respective divider or rib 20, which may comprise a portion of the user input module 18 or may be otherwise positioned or located between the inputs or buttons 18*a*. The dividers or ribs or notches 20 function to limit or substantially preclude accidental or unintentional actuation or pressing of two inputs or buttons at the same time by a user. The inputs or buttons may include such a rib or other haptic/tactile/texture structure or element for easier "no-look" button finding. The rib or other structure/element/texture assists a user in actuating the buttons by guiding the user's finger so that the user presses in the appropriate area of the button. Optionally, and with reference to FIG. 15, a user input module 18'''' may have seamless buttons or inputs 18a'''' disposed at least partially along the user input module so as to provide a substantially continuous outer surface at the user input module and bezel portion 12''''. Such a user input module 18'''' may include indicators 22'' or may include backlighting to demarcate the individual user inputs or buttons 18a'''' or may screen print or otherwise establish icons and/or text at the appliqué 18h'''' or the like to indicate the location of the individual buttons to ease actuation of the buttons by a user of the user input module and mirror assembly.

Figure 10A:
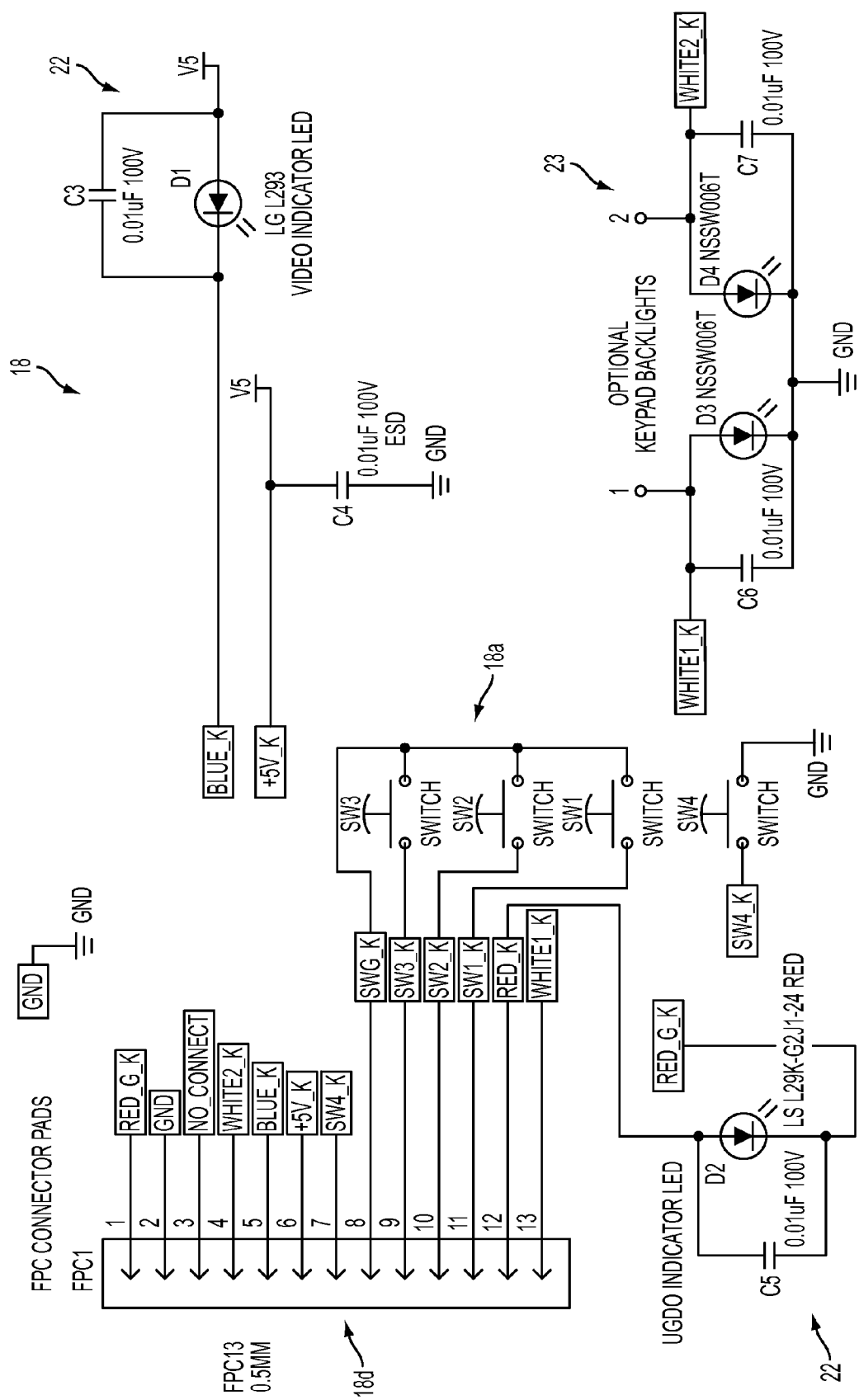

Optionally, and with reference to FIGS. 8 and 10, an illumination source or indicator 22 (such as a light emitting diode (LED) or the like) may be provided at the user input module 18 (such as at the circuitry element or circuit board 18b of the user input module) and may be operable to indicate a setting of an accessory associated with the user input or inputs (such as to indicate when the accessory is "on"), or a backlighting illumination source or LED 23 (FIGS. 10 and 10A) may be operable to illuminate or backlight a portion of one or more of the user inputs 18a to ease viewing and discerning of the user inputs by the driver or occupant of the vehicle during low lighting conditions, such as at nighttime, such as by utilizing aspects of the mirror assemblies described in U.S. patent application Ser. No. 11/451,639, filed Jun. 13, 2006, now U.S. Pat. No. 7,527,403, which is hereby incorporated herein by reference in its entirety. Optionally, and as shown in FIG. 10A, the user input module may include backlighting illumination sources 23 and indicator LEDs 22, such as, for example, a video indicator LED and a universal garage door opener indicator and/or the like. The flexible ribbon cable 18d may be electrically or conductively connected to respective traces or circuitry of the user input module or flexible circuit element. In the illustrated embodiment, the flexible cable comprises a 13 pin connector (which may allow for connecting to a common mirror circuit board and may allow for future options and/or more buttons or indicators or the like to be added to the user input module).

In the illustrated embodiment, the user inputs 18a may all be printed white with continuous white backlighting. Optionally, the button borders may be white embossed (if possible) and continuously backlit (optionally in a manner that is dimmer than the symbols). The user input module may have a black background across the module, and may have a top or outer surface that has a gloss finish. Optionally, the two indicators may have a matte finish and/or may have a color printing at or near the indicators. Optionally, the indicators may have no color printing and may the input module have a "dead front" printed or screened over the indicators for a black or dark appearance when the indicators are not activated. Optionally, the user inputs may require a button force of about 350-450 grams or any other suitable button force, without affecting the scope of the present invention.

Optionally, and as shown in FIG. 9, the user input module 18 may include a photosensor or the like for sensing the ambient light and/or glare light at the mirror and/or incident on the mirror reflective element. For example, a photosensor 24 may be established at the user input module substrate or element 18b and may receive or sense light at the bezel portion of the mirror (where a control, such as for a variable reflectance electro-optic or electrochromic reflective element may control the dimming of the reflective element in response to an output of the photosensor or photosensors). Optionally, the photosensor 24 may be disposed at the user input module 18 and close to the rearward or outer surface (the surface at or near the outer surface of the bezel portion 12 that a driver of the vehicle views when the mirror assembly is normally mounted at the vehicle), and a cover layer or appliqué 18h may be silkscreened or otherwise established over the photosensor 24 so that the photosensor is not readily viewable or discernible by a person viewing the mirror and bezel portion. The cover layer may provide a window portion or aperture 18i that is generally at or in front of photosensor 24 and that allows transmission of light therethrough (for example, the cover layer may be a clear or translucent or transparent cover layer). Optionally, the cover layer 18h may function to hide or conceal or render covert the photosensor 24 of the user input module 18. The cover layer may extend over the outer surface of the user input module and may also conceal or render covert the illumination source (if applicable) of the user input module, whereby a person may not readily view or discern the illumination source unless the illumination is activated.

Figure 11:
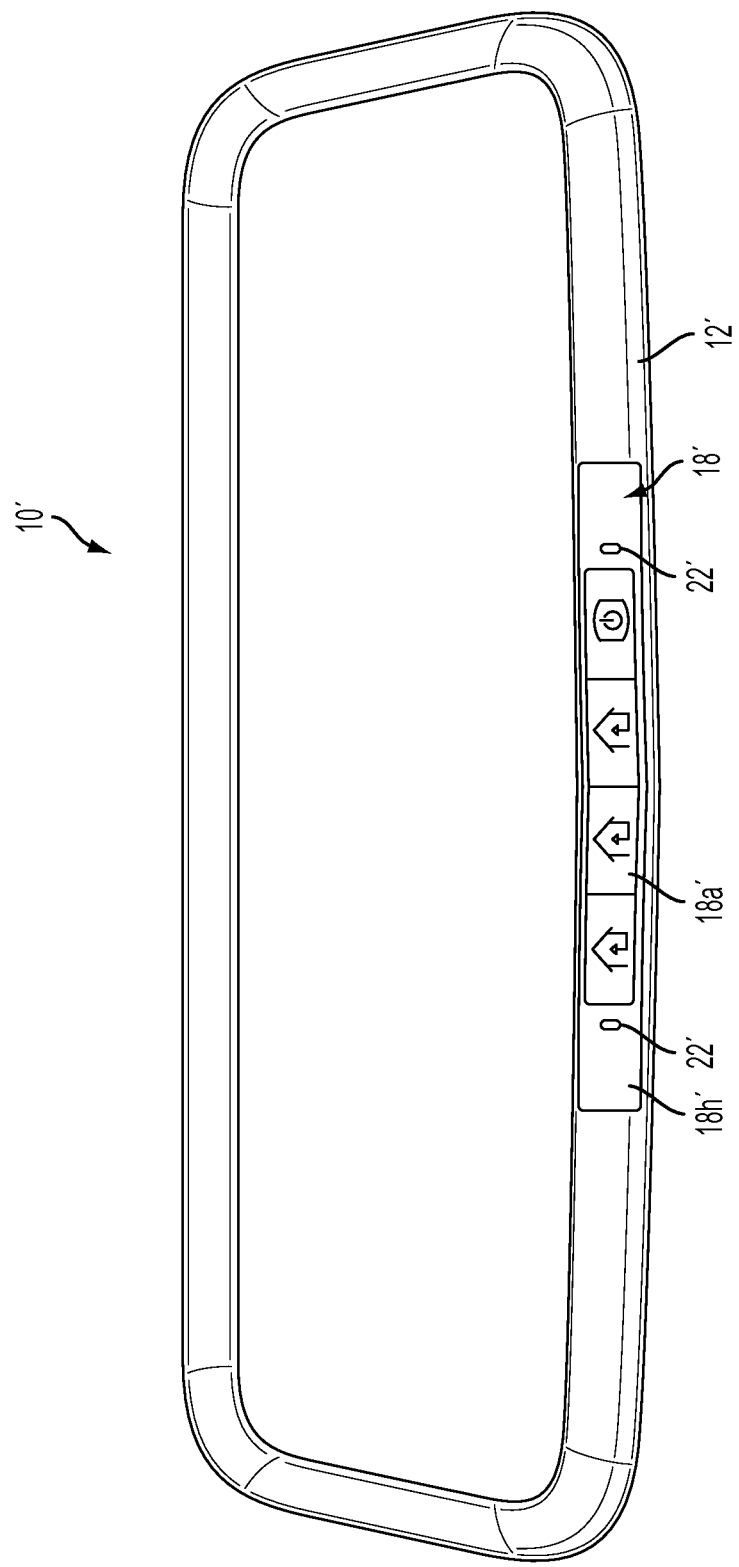
FIG. 11 is a front elevation of another interior rearview mirror assembly in accordance with the present invention.

Optionally, the surface or finish of the user inputs may have a brushed or polished metallic finish or appearance or a chrome appearance or a color or wood grain appearance or the like, if desired. It is further envisioned that, since the user input module may be readily snapped onto or attached to or adhered to the bezel portion of the mirror assembly, the user input module and/or the user inputs or buttons may be provided in a variety of colors and/or with a variety of markings or indicia thereon, so that the user inputs may be selected by the customer to provide a customized or personalized appearance to the mirror assembly, such as by utilizing aspects of the mirror assemblies described in U.S. Pat. Nos. 7,255,451 and/or 7,289,037; and PCT Application No. PCT/US04/15424, filed May 18, 2004, and published Dec. 2, 2004 as International Publication No. WO 2004/103772, which are hereby incorporated herein by reference in their entireties. Optionally, an outer surface or face of the user input module may have, for example, a wood grain finish or a brushed metal finish or black gloss finish or the like, depending on the particular application of the user input module and mirror assembly at which it is disposed. Optionally, and as shown in FIG. 11, an outer surface or cover layer 18h' of the body portion of the user input module 18' may have a brushed metal or chrome appearance, while the user inputs 18a' may have other surface finishes, such as a surface finish that generally matches that of the bezel portion, so as to provide a contrasting appearance at the user input module. Optionally, and as shown in FIG. 13, an outer surface or cover layer or appliqué 18h'' of a user input module 18'' may have a wood grain appearance, while the user inputs 18a'' may have other surface finishes, such as a surface finish that generally matches that of the bezel portion, so as to provide a contrasting appearance at the user input module.

Optionally, and as shown in FIG. 11A, the user input module 18' may have four user inputs or buttons 18a', such as for a universal garage door opening system of the vehicle. The user input module may have a gloss black opaque background area or surface, and/or may have matching interior or exterior vehicle colors or trim colors or the like, and/or may have a selected logo or icon or indicia or graphics thereon, such as a vehicle logo or the like, and/or may have other selected or desired appearance features, such as other graphics, or other surface appearances, such as a carbon-fiber appearance or other glosses or colors or the like. In the illustrated embodiment, the user input module 18' includes indicators 22', which may be backlit with one or more illumination sources or LEDs, such as an indicator for a garage door opening system of the vehicle that is activated when one of the user inputs associated with the garage door opening system is activated. Optionally, the appearance of the user input module or keypad may be customized or personalized to provide the vehicle manufacturer or vehicle owner the option of selecting color and/or icons or indicia of the keypad, such as by utilizing aspects of the systems and mirror assemblies described in PCT Application No. PCT/US2006/018567, filed May 15, 2006 and published Jul. 5, 2007 as International Publication No. WO 2006/124682; and/or PCT Application No. PCT/US2004/015424, filed May 18, 2004 and published on Dec. 2, 2004, as International Publication No. WO 2004/103772, and/or U.S. patent application Ser. No. 11/912,576, filed Oct. 25, 2007, now U.S. Pat. No. 7,626,749, which are hereby incorporated herein by reference in their entireties. Optionally, for example, a red (or other color) indicator may be provided for the garage door opening system and a green (or other color) indicator may be provided as an EC indicator (for indicating when the electrochromic reflective element is dimmed or darkened) or the like. Optionally, and desirably, the indicators are substantially uniformly backlit with no hot spots, and the user input module does not allow for light-leaks around the indicators and edges of keypad or user input module.

The user inputs 18a' may have icons or indicia printed or screened thereon (such as white indicia on a black or dark background). Optionally, the icons or indicia may be screen printed on the outer surface (the surface generally facing the driver of the vehicle when the mirror assembly is normally mounted in the vehicle) or may "second surface printed", where the icons or indicia are screen printed or otherwise established on the rear or second surface of the outer layer of the user input module or on a layer or element disposed beneath a translucent outer layer (such that the icons or indicia cannot be readily scratched off). The user input module 18' may include button dividers 20', which may be embossed or raised between adjacent buttons. Optionally, the button dividers may be black or dark to match the outer surface or background of the user input module, or may comprise a chrome color or appearance or other desired or selected color or appearance, depending on the particular application of the user input module and mirror assembly. Optionally, the button perimeter lines may be engraved and/or may comprise printed outlines or graphics to demarcate or identify the individual buttons or inputs.

Figure 12:
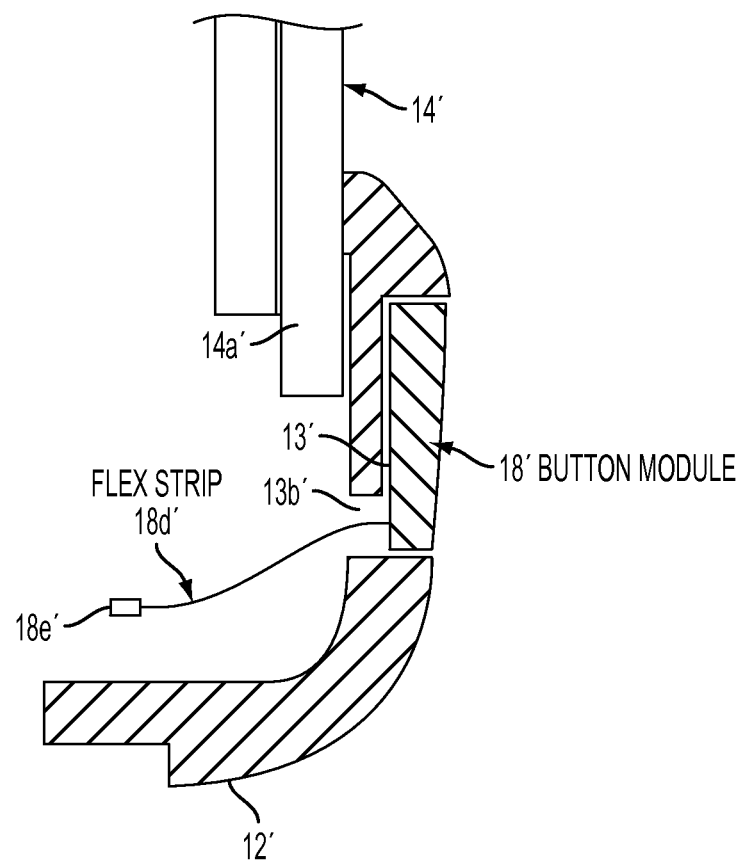
FIG. 12 is an enlarged sectional view of the button region of the mirror assembly of FIG. 11.

As shown in FIG. 12, user input module 18' may also include an electrical connector 18d' for electrically connecting user inputs 18a' to electronic circuitry of the mirror assembly, such as a printed circuit board or the like within the mirror casing of mirror assembly 10' or such as a wiring harness or lead at or in the mirror assembly that extends or connects to a wiring harness of the vehicle. Electrical connector 18d' extends from body or circuitry element 18b' of user input module and passes through an aperture 13b' formed through bezel portion 12' at recess 13', whereby the electrical connector (which may have a plurality of wires and a multi-pin plug or socket type connector 18e' at an end thereof) may be plugged into or otherwise readily connected to the mirror circuitry or vehicle circuitry or the like. As shown in FIG. 12, electrical connector 18d' may pass through aperture 13a' below the lower perimeter edge region 14a' of reflective element 14', while a portion of the user input module 18' may overlap or encompass the lower perimeter region 14a' of the reflective element 14', such as in a similar manner as described above.

Optionally, an illumination source 22' (such as a light emitting diode (LED) or the like) may be provided at the user input module (such as at the circuitry element or circuit board of the user input module) and may be operable to indicate a setting of an accessory associated with the user input or inputs (such as to indicate when the accessory is "on"), or to illuminate a portion of one or more of the user inputs to ease viewing and discerning of the user inputs by the driver or occupant of the vehicle during low lighting conditions, such as at nighttime, such as by utilizing aspects of the mirror assemblies described in U.S. patent application Ser. No. 11/451,639, filed Jun. 13, 2006, now U.S. Pat. No. 7,527,403, which is hereby incorporated herein by reference in its entirety.

Figure 17:
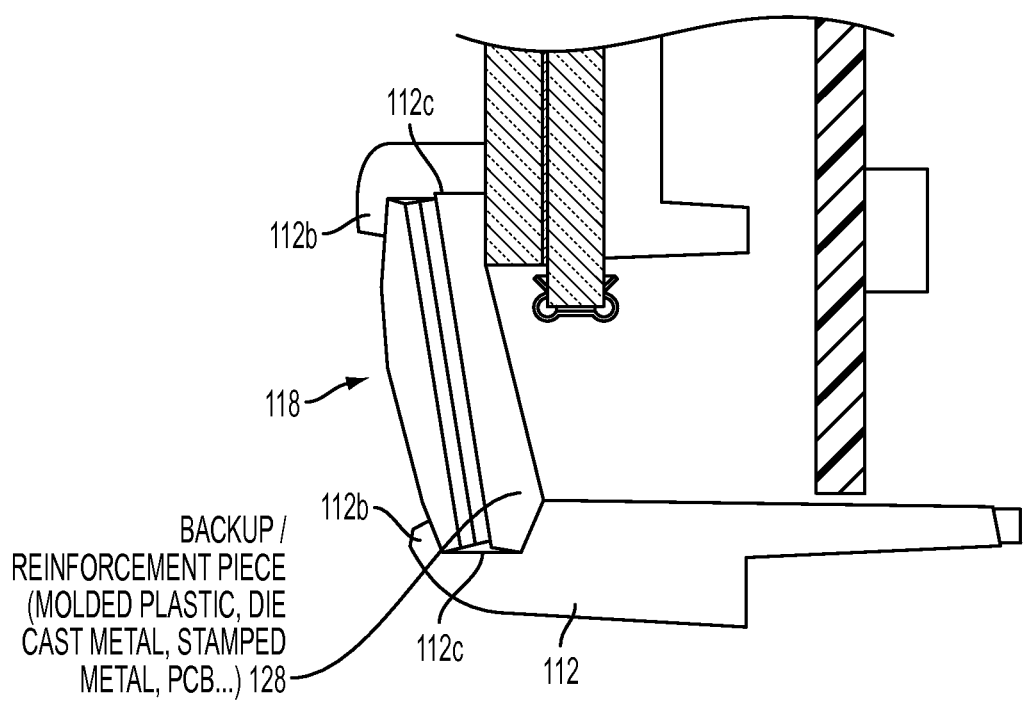
FIG. 17 is an enlarged sectional view of the button region of another mirror assembly of the present invention, shown with a reinforcement element disposed behind the user input module region of the bezel.

Optionally, and with reference to FIG. 17, the user input module or keypad 118 may be loaded or inserted or installed into the bezel portion 112 from a rear or back surface of the bezel portion. In such an application, the mirror assembly 110 or bezel portion 112 may include a reinforcement element 128 disposed at the bezel portion 112 and behind the user input module 118. The reinforcement element 128 may provide support or reinforcement behind the user input module to resist flexing of the user input module and/or bezel portion when a user actuates or presses against one of the user inputs or buttons of the user input module. The reinforcement element 128 may comprise any suitable element, such as a polymeric or plastic element, such as a molded plastic element or the like, or a metallic element, such as a die cast metallic element or stamped metallic element or the like, or a circuit board substrate or the like, or the reinforcement element or structure may be provided by one or both of the glass elements or mirror substrates of the mirror reflective element extending downward so as to be disposed behind the keypad or user input module, while remaining within the spirit and scope of the present invention. The reinforcement element 128 may be disposed behind the bezel portion at the location at which the user input module is disposed, or may be disposed at an aperture of the bezel portion to act as the backing to the user input module, or the bezel portion may be insert molded over (or may otherwise include) a metallic or otherwise stronger or more robust or non-flexible or less flexible element to provide the desired or appropriate rigidity at and behind the user input module, while remaining within the spirit and scope of the present invention.

As shown in FIG. 17, the bezel portion may optionally be formed with an aperture therethrough so as to allow for installation of the user input module 118 from the rear of the bezel portion. In the illustrated embodiment, the bezel portion may include overlap portions or tabs or lips 112b that overlap a perimeter region of the user input module to limit the user input module from passing through the bezel portion when inserted into the aperture 112c from the rear of the bezel portion 112. The reinforcement element 128 may be inserted or received in the bezel portion and behind the user input module to retain the user input module 118 in the bezel portion 112 and between the lips 112b and the reinforcement element 128 and to limit flexing of the user input module during operation thereof. Optionally, the reinforcement element 128 may comprise part of or may be incorporated into the user input module or keypad to provide an at least partially rigid keypad at and in the bezel portion.

Optionally, the incorporated reinforcement element 128 may comprise a substantially rigid circuit board with the keypad circuitry established thereon so that the keypad or user input module is not flexible.

The user input module may be attached to the bezel portion via any suitable means, and may be received in a recess formed at the front surface of the bezel portion (the surface generally viewable by the driver of the vehicle when the mirror assembly is normally mounted in the vehicle), or may be attached onto a non-recessed front surface of the bezel portion, depending on the particular application of the user input module and mirror assembly. For example, and with reference to FIGS. 18A-E, the user input module 18 may be received in a recess formed at the front surface of a bezel portion and may be snapped to the bezel portion via a snap element 130 (FIG. 18A) or may be secured to the bezel portion via a push-in element or Christmas-tree type fastener 132 or the like (FIG. 18B), or via heat staking or sonic welding posts 134 or the like (FIG. 18C). Optionally, the bezel portion or mirror assembly may include a thin bezel element 136 (FIG. 18D) that overlaps or overlays the user input module and attaches to the bezel portion to secure or retain the user input module or keypad at the bezel portion. Optionally, the user input module may be welded (such as via sonic welding or the like) or adhered to the bezel portion, such as shown in FIG. 18E. Optionally, and as shown in FIGS. 19A and 19B, the user input module 18 may be snapped into a recess 113' formed in the bezel portion 112', with lips or tabs 112b' securing or retaining the user input module therein.

Figure 20:
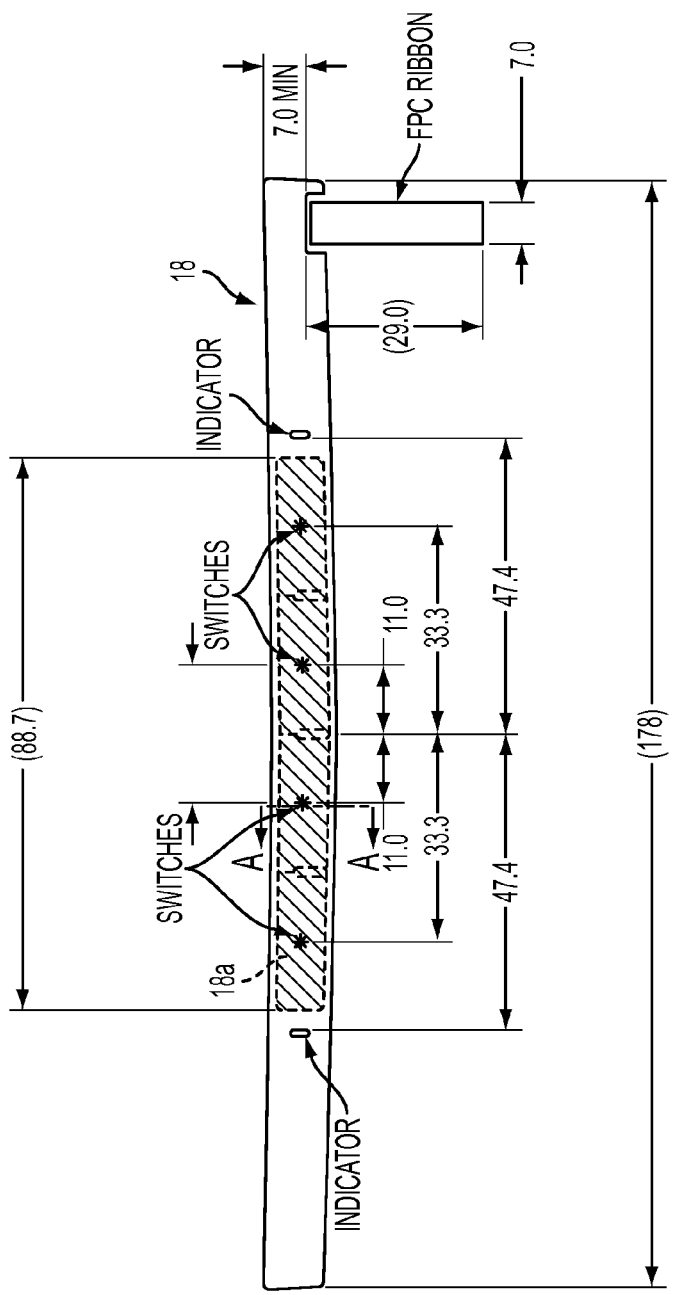
FIG. 20 is a plan view of a user input module of the present invention, showing exemplary dimensions.
Figure 20A:
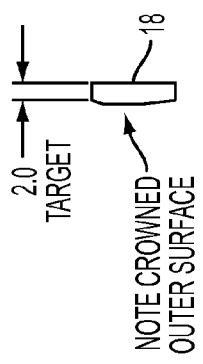
FIG. 20A is a sectional view of the user input module taken along the line A-A in FIG. 20.
Figure 21:
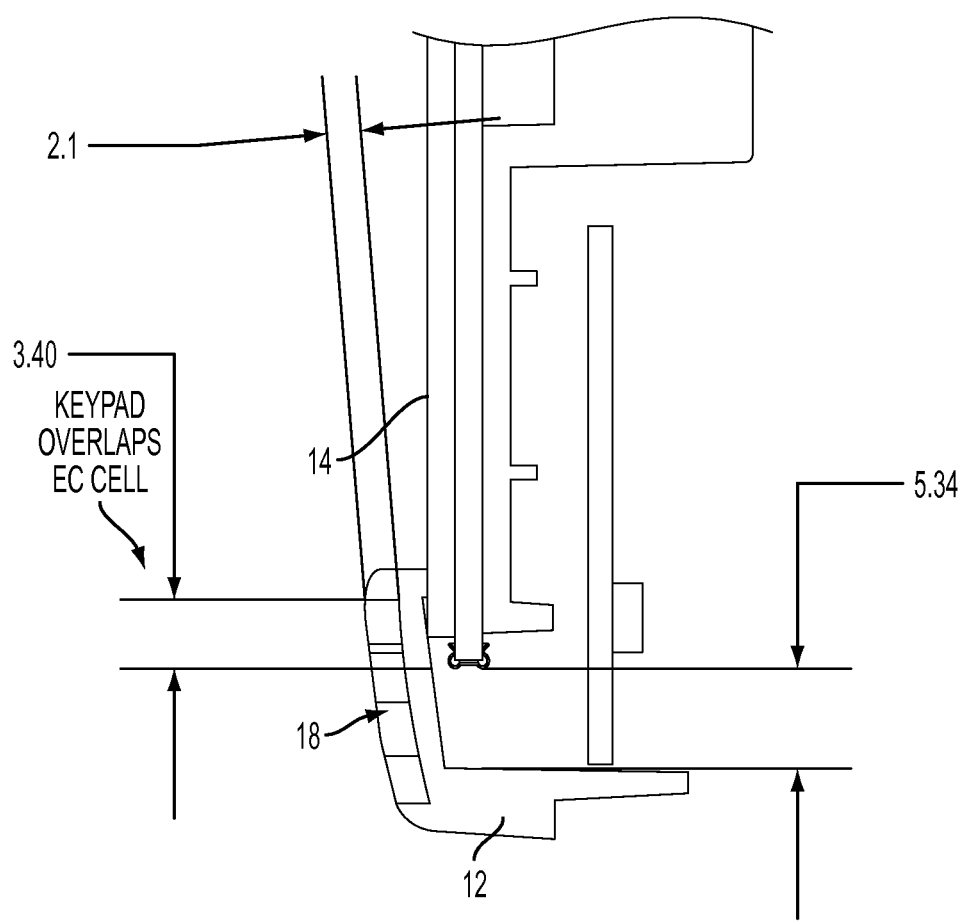
FIG. 21 is another sectional view of the button region of a mirror assembly of the present invention, showing exemplary dimensions.

Thus, the user input module may attach to the bezel of the mirror assembly and extend along a portion of the bezel, such as a lower or chin portion of the bezel. The user input module may have any sized user inputs or buttons and may extend substantially along the bezel or a reduced amount along the bezel, depending on the particular application and desired appearance of the user input module and mirror assembly. For example, and with reference to FIG. 20, the user input module 18 may extend about 178 mm along a bezel portion of a mirror assembly, and may provide four buttons 18a having a size of about 22 mm or thereabouts (or may have more or less buttons of that size or of a greater or lesser size). Optionally, and desirably, and as shown in FIG. 20A, the user input module 18 may have a crowned outer surface that may follow the contour of the bezel portion when the user input module is received at the bezel portion or may protrude slightly outward from the bezel portion, depending on the particular application and desired appearance of the user input module and mirror assembly. As shown in FIG. 21, the user input module 18 may be generally flush with the outer surface of the bezel portion 12 when attached thereto and may overlap the reflective element 14 by about 3.4 mm or thereabouts, thereby providing larger sized user inputs or buttons at the bezel portion than would otherwise be feasible due to the interference conventional buttons would have with the reflective element.

Figure 22A:
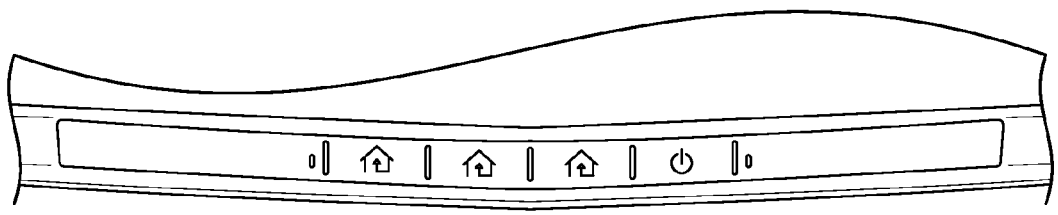
FIGS. 22A-D are plan views of other user input modules of the present invention.
Figure 22B:
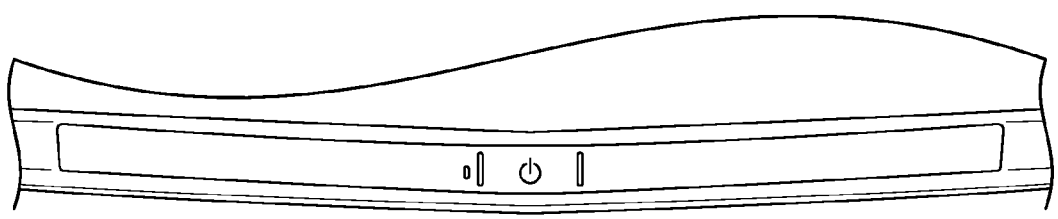
Figure 22C:
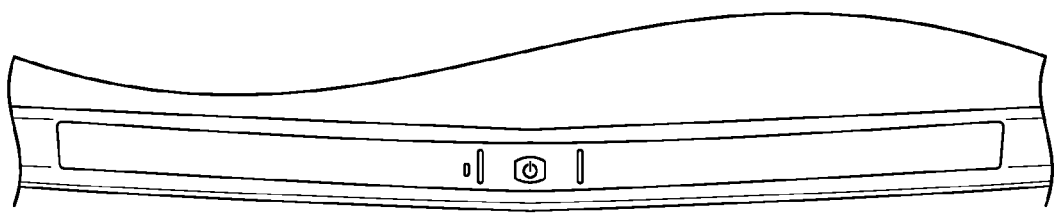
Figure 22D:
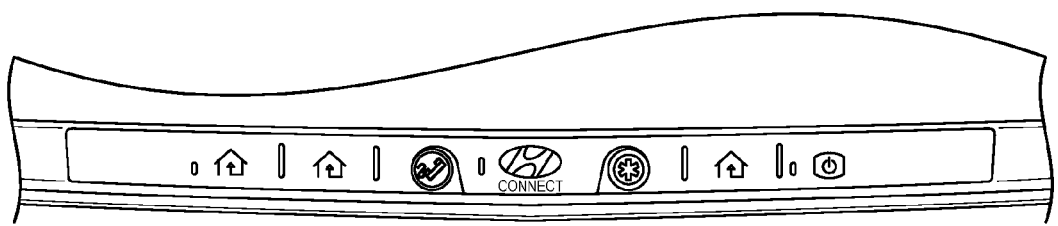

The user input module of the present invention thus may provide any suitable user inputs or buttons or indicators at the bezel portion of the mirror assembly, depending on the particular application of the user input module and mirror assembly. For example, with reference to FIG. 22A, the user input module may provide user inputs or buttons (such as three or four) for a universal garage door opening system of the vehicle. Optionally, for example, and with reference to FIGS. 22B and 22C, the user input module may provide a single user input or button, such as a power button or switch for an accessory, such as a video display or any other accessory, of the mirror assembly and/or of the vehicle. Optionally, for example, and with reference to FIG. 22D, the user input module may provide multiple user inputs or buttons (such as seven or more or less), such as for a universal garage door opening system of the vehicle and for a telematics system of the vehicle (such as an ONSTAR® system or the like), or other suitable or applicable systems or accessories of the mirror assembly and/or of the vehicle.

The user input module may comprise any suitable thin strip or element having one or more user actuatable buttons or switches for controlling or activating/deactivating one or more accessories of the mirror assembly and/or vehicle. For example, and with reference to FIG. 23, a user input module 218 may comprise a flexible circuit element or substrate 228a, such as a printed circuit board with circuitry or conductive traces established on a substrate or semiconductor substrate or chip, such as in a known manner. A layer of adhesive tape 228b may be disposed between the substrate 228a and the switch elements or metal domes 228c (which may be located or disposed at corresponding switch circuitry established at the flexible circuit element or substrate), and a light guide film or sheet 228d (for applications with indicators and/or backlighting) may be adhered to or disposed at the metal domes 228c. A UV actuator 228e may be disposed over the light guide film 228d, and a polyform sheet or film or layer 228f may be disposed over and/or adhered to the UV actuator 228e. The polyform sheet or film 228f may be printed or screen printed with the icons or indicia and may have the indicia printed or established on its outer or first surface (the upper surface of polyform sheet 228f in FIG. 23) or its inner or second surface (the lower surface of polyform sheet 228f in FIG. 23). Optionally, the polyform layer 228f may comprise a translucent layer and the icons or indicia may be established on another layer or foil disposed below the polyform layer. Optionally, the outer surface of the polyform layer may comprise an abrasion resistant layer or surface to resist scratching of the outer surface of the keypad or user input module.

Figure 23:
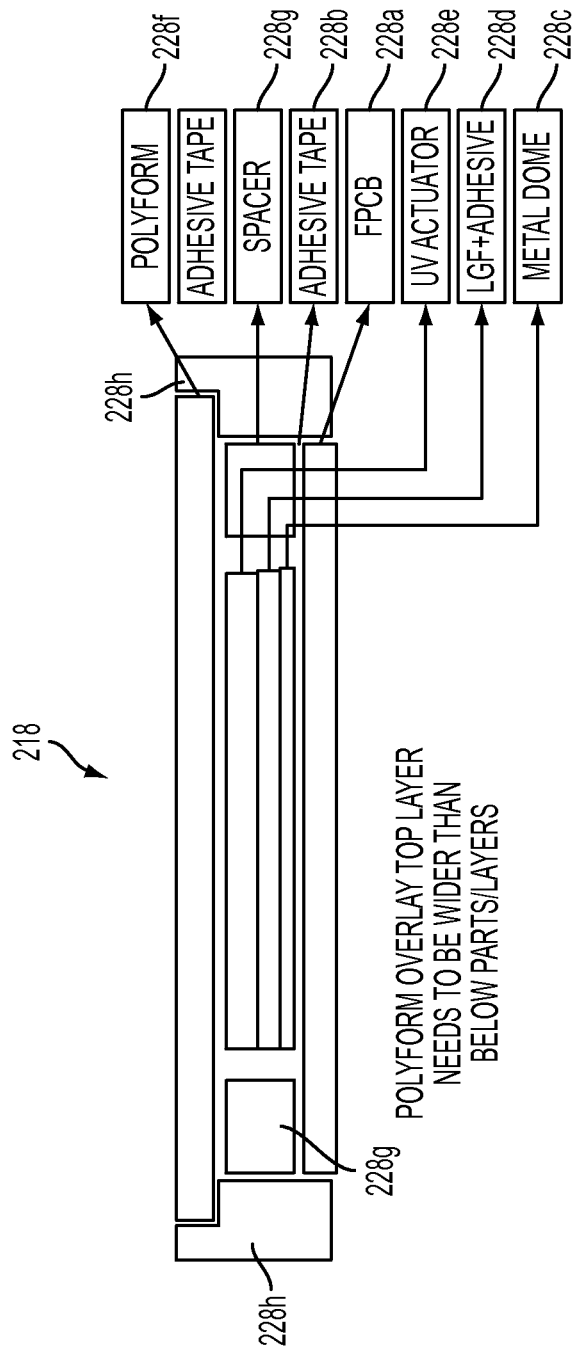
FIG. 23 is a sectional view of a user input module of the present invention.

As can be seen in FIG. 23, a spacer 228g is established between the substrate 228a and the polyform sheet 228f and outboard of the UV actuator 228e, light guide film 228d and metal dome 228c, with the polyform overlay sheet or top layer 228f being wider than the layers or components or elements below the polyform layer 228f and between the polyform layer and substrate 228a. In the illustrated embodiment, perimeter elements or spacers 228h are disposed around the perimeter of the user input module to seal the elements between the outer layer and the base or substrate or bottom layer. Optionally, the flexible circuit element or substrate 228a may be adhered to or disposed at a base support element or the like or may have a layer of adhesive (such as a pressure sensitive adhesive or the like) for attaching the user input module to the bezel portion. Optionally, the base support element or the flexible circuit element may include one or more attachment elements (such as flexible snaps or clasps or posts that protrude therefrom) for inserting into and attaching to the bezel portion to secure or retain the user input module along the bezel portion of the mirror assembly.

Each of the layers or elements of the user input module are thin elements or layers. Thus, when assembled, the user input module comprises a thin, flexible element, such as a flexible strip having a thickness of less than about 3 mm, and preferably generally equal to or less than about 2 mm (or more or less). When installed at the mirror bezel, the outer surface of the user input module is preferably flush with the outer surface of the bezel. The flexible ribbon cable (not shown in FIG. 23) is electrically connected to the circuitry established at the flexible circuit element or substrate and extends therefrom for connecting to the mirror circuit board of the mirror assembly.

The dome switches may provide the desired actuation force (such as an actuation force between about 350 grams and about 500 grams), and may provide a tactile feedback so that the user knows when the switch has been actuated. The indicators (such as red or green or other colored indicators) may be actuated (in response to actuation of the switches or in response to actuation of one or more accessories of the mirror assembly or vehicle) to provide a desired or appropriate intensity. For example, the indicator intensity may be less than around 100 candelas per square meters (cd/m$^2$) at about 20 mA (with the intensity measured at the assembled mirror assembly), or may be more or less, while remaining within the spirit and scope of the present invention. If the user input module is backlit, the backlighting may comprise a white light light emitting diode, and the user input module may be backlit at an intensity of less than about 20 cd/m$^2$ when the backlighting element is operating at less than 20 mA (with the intensity measured at the assembled mirror assembly). Optionally, the user input module may include current limiting resistors for controlling the intensity of the indicator LEDs to facilitate tuning of the brightness of the indicator LEDs. Optionally, the keypad or user input module may include capacitors across the LEDs for EMC protection.

Figure 24:
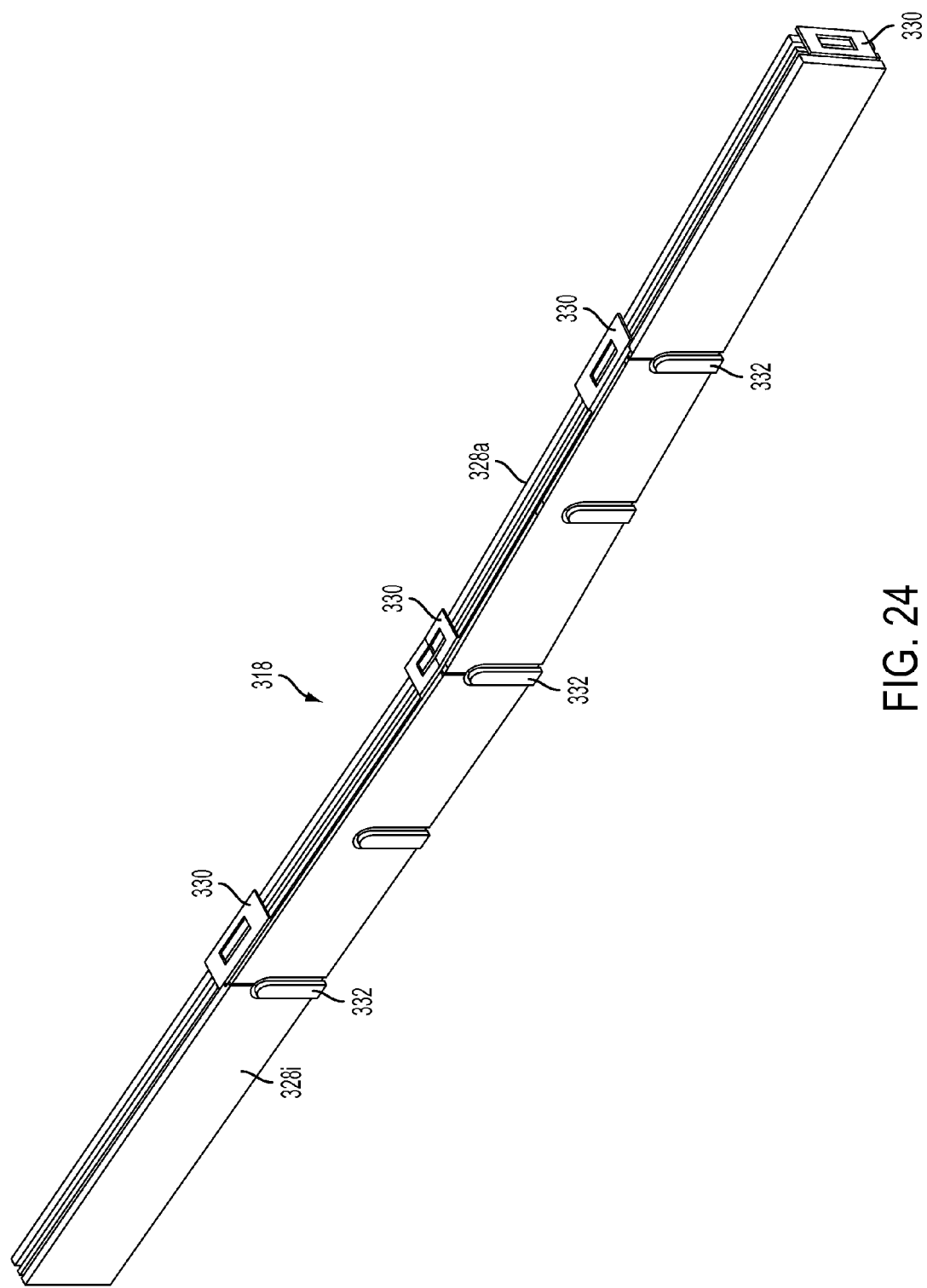
FIG. 24 is a perspective view of another user input module of the present invention.
Figure 25:
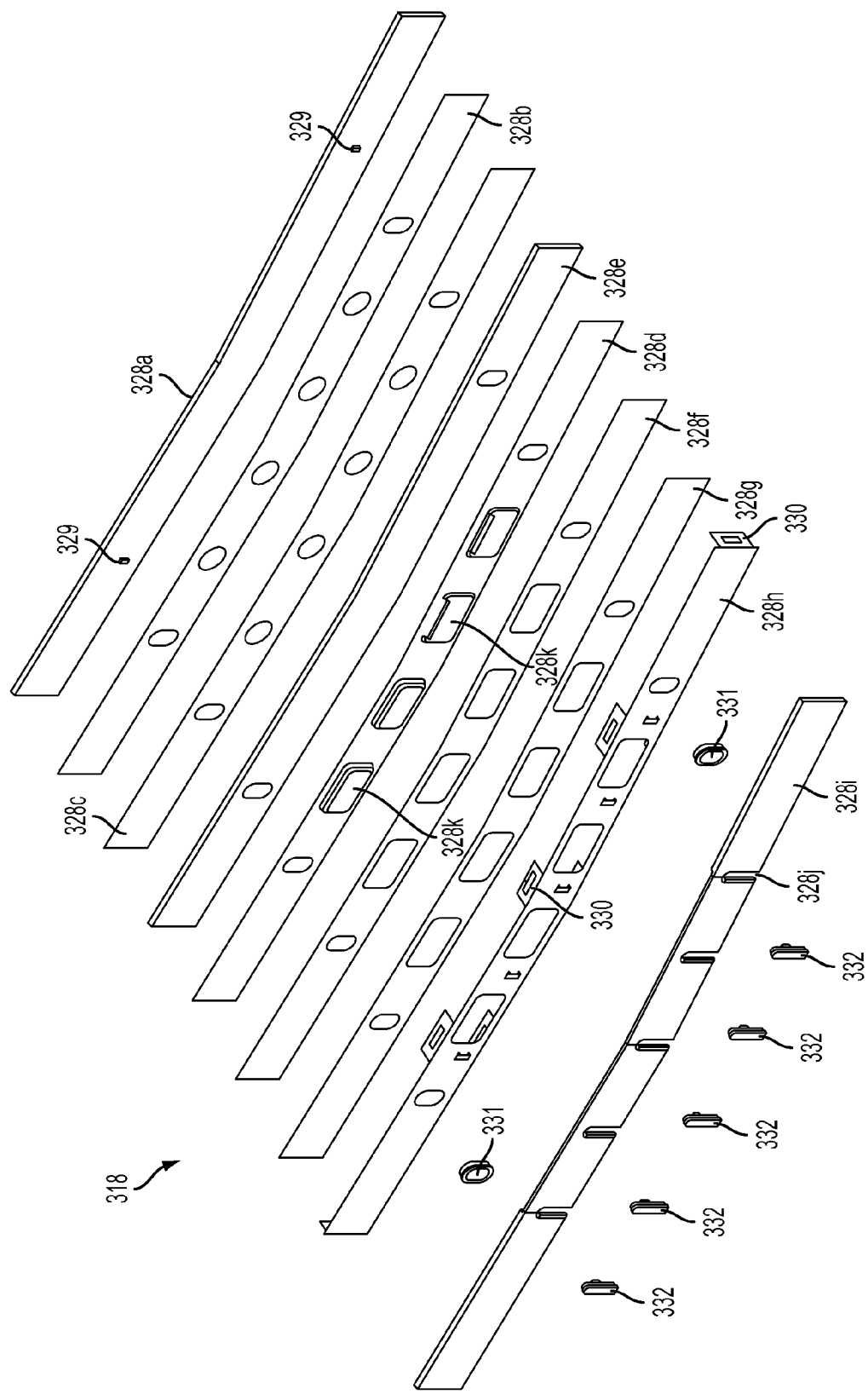
FIG. 25 is an exploded perspective view of the user input module of FIG. 24.
Figure 26:
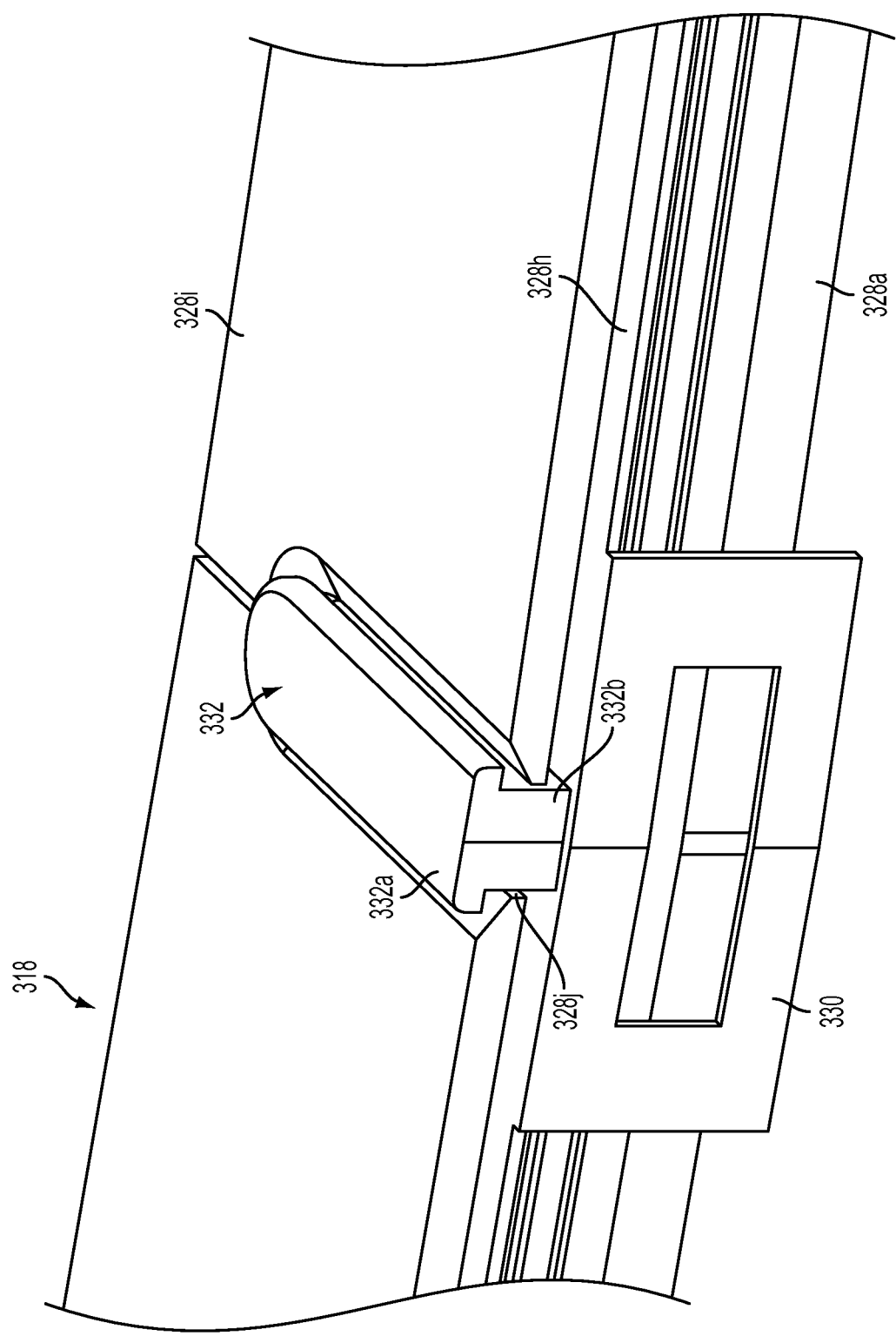
FIG. 26 is an enlarged perspective view of an attachment element of the user input module of FIG. 24.

Optionally, and with reference to FIGS. 24-26, a user input module 318 may comprise a plurality of layers or elements sandwiched together to form the module, with the module including attachment elements or clips 330 integrally formed therewith for attaching to corresponding clips or elements at the mirror casing or bezel. In the illustrated embodiment, user input module 318 includes a flexible (or optionally a rigid or semi-rigid) circuit element or substrate 328a, such as a printed circuit board with circuitry or conductive traces established on a substrate or semiconductor substrate or chip, such as in a known manner. One or more metal dome sheets or strips 328b, 328c (such as a base metal strip 328b with apertures formed therethrough and a metal dome strip 328c with flexible metal domes established or formed thereat) may be disposed between the substrate 328a and a silicon rubber flexible sheet or strip 328d (with raised flexible button portions or areas 328k established thereat), with the switch elements or metal domes 328b, 328c located or disposed at corresponding switch circuitry established at the flexible circuit element or substrate), and with apertures formed through the layers or strips or sheets at the light emitting diodes 329 established at circuit element or substrate 328a. A light guide film 328e may be disposed between metal sheets or layers 328b, 328c and the flexible sheet or strip 328d (and optionally a layer of adhesive or adhesive tape may be disposed between the metal dome layer 328c and the light guide film 328e and/or between the light guide film 328e and the flexible sheet or strip 328d). A layer of adhesive 328f, such as a double sided adhesive strip or tape, may be disposed at flexible sheet 328d and a plastic sheet or strip 328g (such as a TPU strip or the like) may be disposed over the adhesive strip 328f. Optionally, a layer of dark paint or ink (such as black paint or the like) may be established at the rubber strip 328d to limit light transmitting through the rubber strip except where it is desired to backlight portions of the button assembly, such as at the button areas or the like. A metal sheet or strip or element 328h is disposed over the stack of elements 328a-g and includes metallic attachment elements or tabs 330, which may be bent or stamped to extend downward along the sides of the stack of elements (and which include apertures formed therethrough for receiving or partially receiving tabs or clip elements at the mirror casing or bezel to retain the user input module or button module at the mirror casing or bezel when the user input module is attached to the mirror assembly. A cover sheet 328i is disposed over the metal sheet to provide the desired appearance and finish to the user input module. As can be seen in FIG. 25, each of the layers 328f, 328g and 328h include apertures formed therethrough that generally correspond with or align with the dome switches 334 at the flexible sheet 328d and at the metal sheets 328b, 328c such that when a user presses the cover sheet 328i at a switch location, the user may press and flex the button portion of the flexible rubber button strip 328d and may flex and actuate the dome switch at metal dome strip 328c to actuate the appropriate or corresponding circuitry or switch at the circuit element 328a. The lower metal sheet 328b may have suitable apertures formed therethrough to allow for the dome switch of metal sheet 328c to press against the circuitry or switch at the circuit element or substrate 328a to actuate the electronic switch element or circuitry.

As can be seen in FIG. 25, each of the layers 328b-h may include an aperture that generally aligns with the illumination sources or light emitting diodes 329 established at the circuit element 328a, and a light pipe of light guiding element 331 may be disposed at and at least partially in at least some of the apertures to guide the light emitted by the LEDs 329 to the rear of the cover sheet 328i, where the light may transmit through a partially translucent or light transmissive cover sheet or through an aperture formed at the cover sheet for viewing by the driver of the vehicle when the mirror assembly and user input module are normally mounted in the vehicle. The cover sheet or film 328i may be printed or screen printed with the icons or indicia and may have the indicia printed or established on its outer or first surface or its inner or second surface. Optionally, the cover sheet or layer 328i may comprise a translucent layer and the icons or indicia may be established on another layer or foil disposed below the cover sheet or layer. Optionally, the outer surface of the cover sheet may comprise an abrasion resistant layer or surface to resist scratching of the outer surface of the keypad or user input module.

As can also be seen in FIGS. 24-26, cover sheet 328i includes a plurality of notches or gaps 328j established therethrough to separate or demarcate the individual user inputs of the user input module 318, and a plurality of plating keys or retaining elements or divider elements 332 are disposed at the notches or gaps 328j of cover sheet 328i. As can be seen with reference to FIG. 26, the retaining elements 332 are formed with a wider outer portion 332a and a narrowed inner portion 332b (so as to be generally T-shaped in cross section), whereby the narrowed inner portion 332b is received through gaps 328j of cover sheet 328i and the wider outer portion 332a engaged an upper or outer surface of the cover sheet 328i when the retaining elements 332 are inserted or received in the gaps. The lower or inner ends 332c of retaining elements are secured to the metal sheet or layer 328h (such as via heat staking or the like) to mechanically attach the cover sheet 328i to the metal layer 328h and the stack of layers or elements 328a-h. The retaining elements 332 may comprise plastic molded parts (such as plastic injection molded elements) and may be colored or plated or painted or the like to provide the desired appearance to the mirror assembly and user input module. The retaining elements 332 protrude outward from the cover layer to provide raised ribs or the like to enhance the user's ability to find and discern between the different button areas of the user input module.

The cover layer may be etched or printed to establish icons or the like at the switch locations. The keypad background (such as the outer or side regions of the user input module at either side and above/below the user input area or button area) may be formed or colored to provide any desired appearance or finish, such as a black gloss finish or a metallic-like finish or the like. The cover layer may be color matched to interior or exterior vehicle color schemes and/or may include graphics or logos or other color/iconistic elements or finishes to provide the desired appearance, depending on the particular application of the user input module and the mirror assembly. The LED indicators may comprise any suitable or desired color LED, depending on the particular application. The LED indicators may be part of the keypad and may provide a neutral color and may be backlit so that the indicators are not readily viewable and discernible unless the LEDs at the circuit substrate are activated. Preferably, the indicator locations are uniformly backlit with no bright or hot spots and no light leaks around the edges of the keypad. The button area background may comprise any suitable color and/or finish, such as a black matte opaque finish or other colors or graphics or finishes, depending on the particular application of the user input module and mirror assembly. Optionally, the button areas may be raised or recessed at the cover layer to provide easy locating of the buttons by the user. The button areas may include icons or the like etched or otherwise established thereat, and the icons may be backlit (such as via white or color LEDs).

Each of the layers or elements of the user input module are thin elements or layers. Thus, when assembled, the user input module comprises a thin, flexible element, such as a flexible strip having a thickness of less than about 3 mm, and preferably generally equal to or less than about 2 mm (or more or less). The metallic attachment elements or clips 330 allow the user input module to be snapped into the recessed portion of the bezel or otherwise mechanically attached at or in the mirror bezel. When installed at the mirror bezel, the outer surface of the user input module is preferably flush with the outer surface of the bezel. The electrical connector (such as a flexible ribbon cable or the like) is electrically connected to the circuitry established at the flexible circuit element or substrate and extends therefrom for connecting to the mirror circuit board of the mirror assembly.

Optionally, the user input module may include a metallic cover layer or the like to provide a metallic outer finish at the mirror bezel. For example, and with reference to FIGS. 27 and 27A, a user input module 418 includes a metallic external frame or cover layer 428g (such as an aluminum frame, such as an anodized aluminum frame that may be brushed or colored or painted or coated to provide the desired color and finish and appearance). Metallic cover layer or frame 428g may be formed or bent or stamped to include attachment elements 430 (such as clips or snap-type elements) that extend rearward from the front of the user input module for attaching to the mirror bezel, such as in a similar manner as discussed above.

User input module 418 includes a circuit element or substrate 428a (such as a printed circuit board or the like), with a light guide film or layer 428b adhered to the circuit substrate 428a via an adhesive layer or tape 428c. The light guide film 428b guides light emitted by the illumination sources at the circuit board so as to backlight the button regions of the button module. A rubber or elastomeric layer 428d is disposed at the light guide film 428b, and a keytop or keypad or button strip 428e is adhered to the elastomeric layer 428d, such as via one or more strips of tape 428f or the like. The outer frame 428g may be adhered to the elastomeric layer 428d via one or more strips of frame tape 428h or the like to retain the frame 428g to the stack of layers 428a-f.

Figure 27:
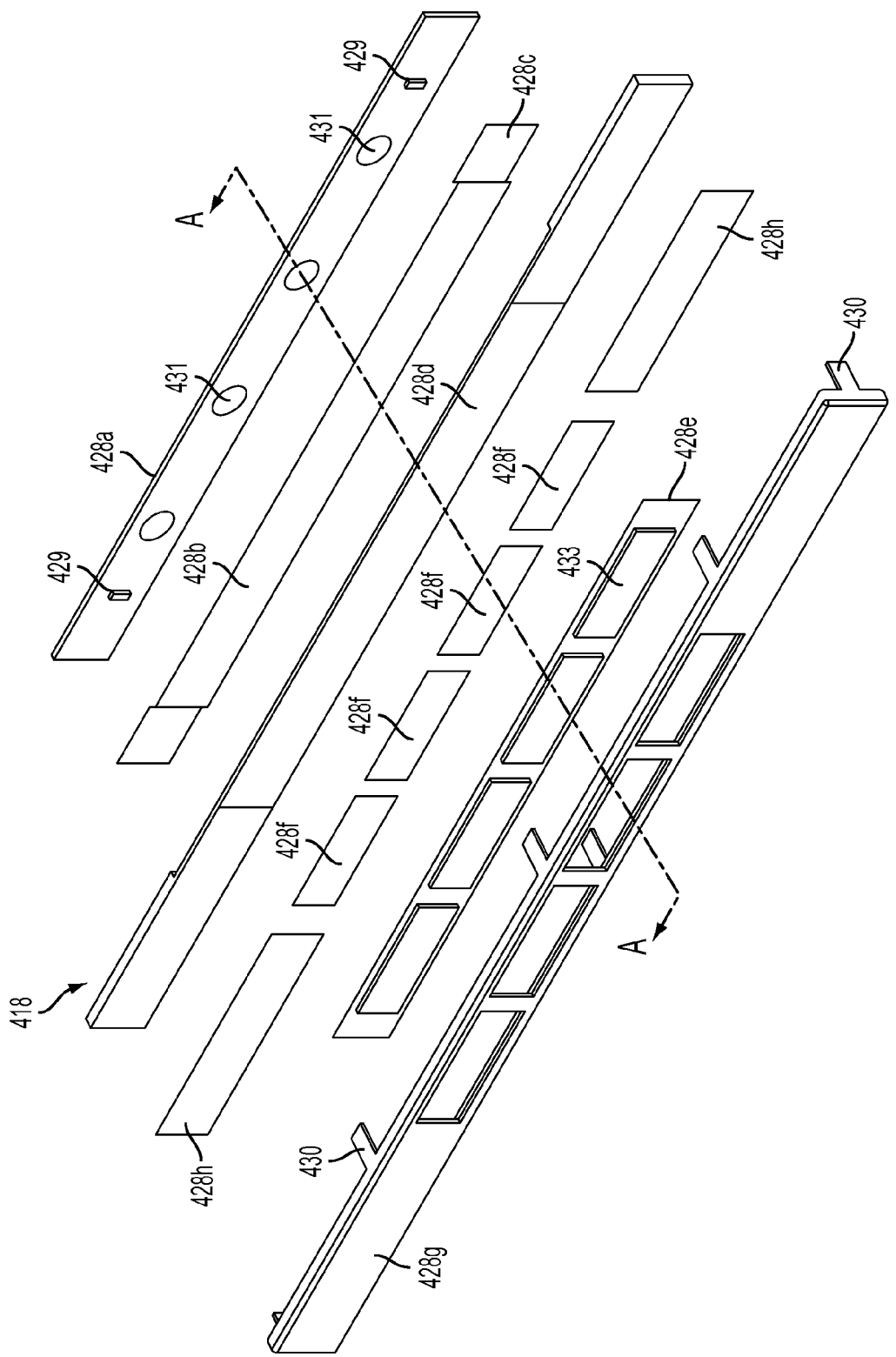
FIG. 27 is an exploded perspective view of another user input module of the present invention.
Figure 27A:
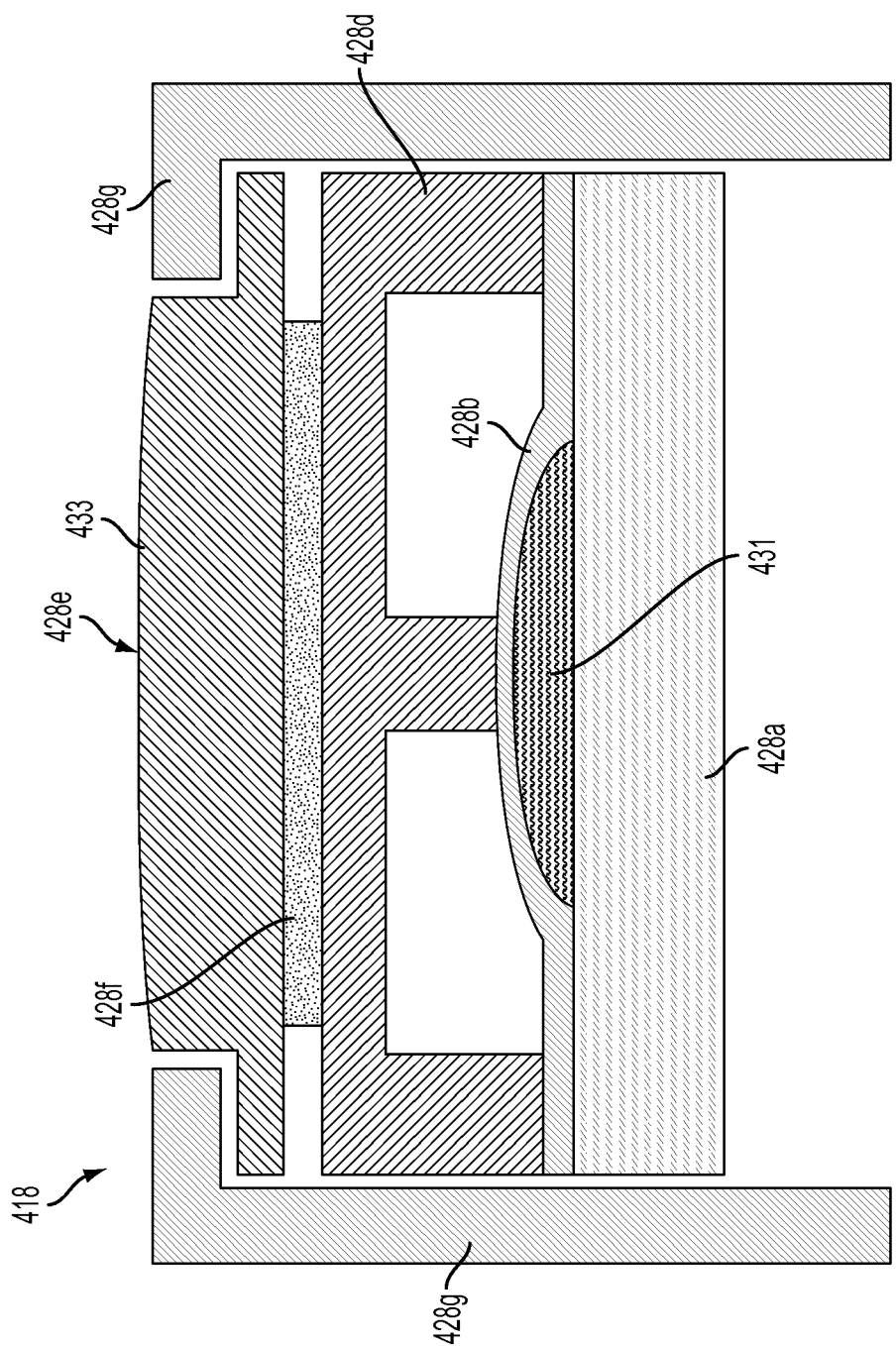
FIG. 27A is a sectional view of the user input module taken along the line A-A in FIG. 27.

As shown in FIG. 27A, the button pad or strip 428e has raised button portions 433 that may protrude at least partially through apertures in the frame 428g. The keypad may have icons or the like established thereat (for example, the second surface or inner surface may have icons or the like silk screened thereon or otherwise established thereat so as to be viewable to a person viewing the user input module when the icons are backlit by one or more illumination sources or LEDs at the circuit board). The elastomeric or TPU film or strip 428d includes a protrusion that extends toward the circuitry or switch 431 at the circuit substrate 428a and that actuates the switch 431 when the button is depressed by a user. As shown in FIG. 27, circuit substrate 428a may also include one or more illumination sources or light emitting diodes 429 for backlighting indicator regions at either side of the buttons (or elsewhere at the user input module), such as in a similar manner as described above (and the module may include one or more light guides or light pipes or light guide film or layer to guide the light toward the rear of the cover or frame). Optionally, the metallic frame 428g may have apertures established therethrough (such as via laser etching or UV protrusion or the like) to allow for light emitted by the LEDs 429 to be viewable and discernible to a person viewing the user input module at the mirror assembly when the mirror assembly is normally mounted in a vehicle.

Figure 28:
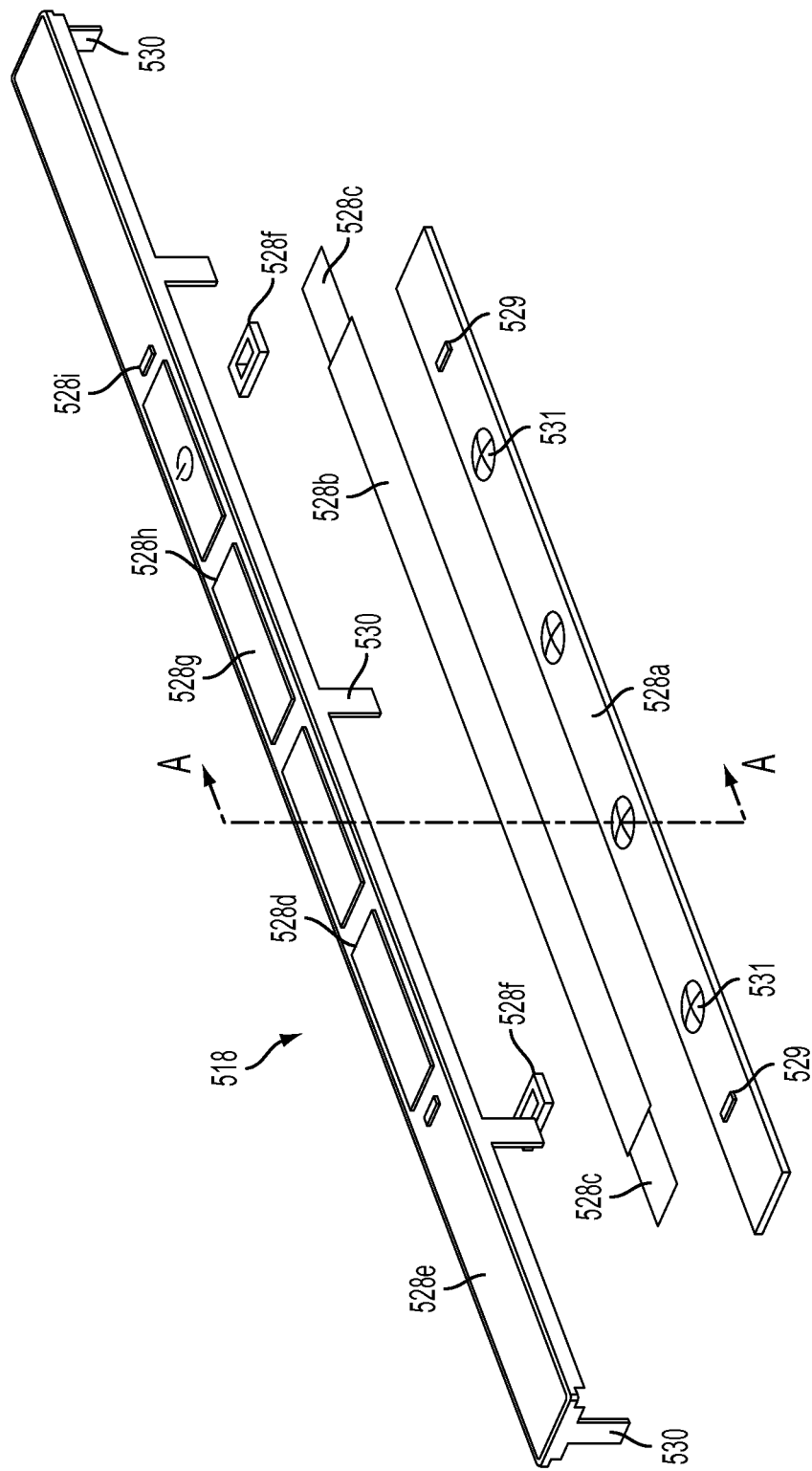
FIG. 28 is an exploded perspective view of another user input module of the present invention.
Figure 28A:
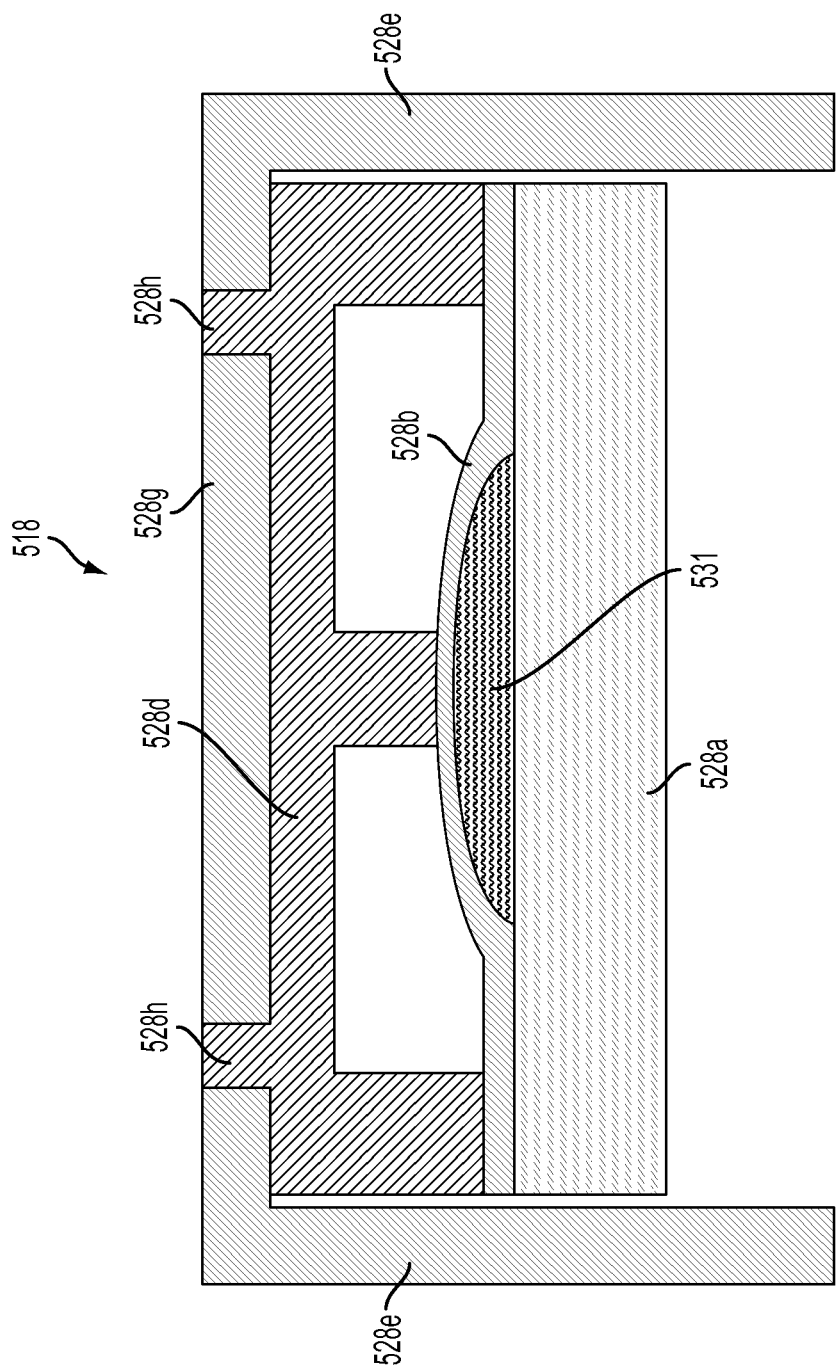
FIG. 28A is a sectional view of the user input module taken along the line A-A in FIG. 28.

Optionally, and with reference to FIGS. 28 and 28A, a user input module 518 includes a metallic external frame or cover layer 528e (such as a stainless steel frame or the like that may be brushed or colored or painted or coated to provide the desired color and finish and appearance). Metallic cover layer or frame 528e may be formed or bent or stamped to include attachment elements 530 (such as clips or snap-type elements) that extend rearward from the front of the user input module for attaching to the mirror bezel, such as in a similar manner as discussed above.

User input module 518 includes a circuit element or substrate 528a (such as a printed circuit board or the like), with a light guide film or layer 528b adhered to the circuit substrate 528a via an adhesive layer or tape 528c. A rubber or elastomeric button layer 528d is molded at the metallic cover layer 528e and the co-molded metallic cover layer and elastomeric buttons are adhered to the light guide film 528b via an adhesive layer 528f (such as foam tape or the like, such as, for example, Poron tape or the like). As can be seen in FIG. 28, foam adhesive layer or element 528f is disposed generally between the light emitting diodes 529 at the circuit board and apertures 528i established through the metal cover 528e and thus allows light emitted by the light emitting diodes 529 to be transmitted through an aperture or passageway formed in the adhesive elements and through the apertures 528i formed in the metal cover.

As shown in FIG. 28A, the button layer or pad or strip 528d has raised button portions that may protrude at least partially through apertures in the frame 528e. For example, the frame may have apertures or frame lines formed at least partially around each button area and the rubber material may be molded within the frame lines to provide a rubber frame around each of the button areas so that a user may more readily recognize the button locations at the user input module. In such a configuration, the center or actuatable region of the button may comprise a button portion 528g of the metallic frame 528e, with a portion 528h of the elastomeric or rubber material of button strip 528d protruding through a border slot formed or cut or etched at least partially around the metallic button portion (such as most of the way around the metallic button portion with a portion of the metallic frame including one or more connecting portions spanning the slot and connecting the button portion with the rest of the frame). Optionally, one or more icons may be formed or cut or etched through the metal frame at the button areas and the rubber material of the button strip may be molded therein to fill in the etched or cutout regions of the metal frame or cover layer. Optionally, the button layer or strip may comprise a soft or elastomeric or rubber material or may comprise a more rigid material, depending on the particular application and desired appearance and/or feel of the button module. Optionally, the border portions and/or icon portions of the button strip (that fill or partially fill the slots or apertures formed or cut or etched in the metal frame or cover) may be generally flush with the outer surface of the metal frame or cover or may protrude outwardly beyond the plane of the outer surface (or optionally may be recessed within the slot or slots or apertures), depending on the particular application and desired appearance and/or feel of the button module.

The button layer or strip 528d includes a protrusion that extends toward the circuitry or switch 531 at the circuit substrate 528a and that actuates the switch 531 when the button is depressed by a user. As shown in FIG. 28, circuit substrate 528a may also include one or more illumination sources or light emitting diodes 529 for backlighting indicator regions at either side of the buttons (or elsewhere at the user input module), such as in a similar manner as described above (and the module may include one or more light guides or light pipes to guide the light toward the rear of the cover or frame). Optionally, the metallic frame 528e may have apertures 528i established therethrough (such as via laser etching or UV protrusion or the like) to allow for light emitted by the LEDs 529 to be viewable and discernible to a person viewing the user input module at the mirror assembly when the mirror assembly is normally mounted in a vehicle. The light guide film may direct the light emitted by one or more illumination sources at the circuit element so as to backlight the button regions at the cover or frame. Optionally, the button module may have the borders (that are filled or partially filled with the silicone or rubber or urethane material (or other suitable material) of the button strip) back lit and/or the icon or icons formed or cut or etched in the button portions (and optionally filled or partially filled with the silicone or rubber or urethane material (or other suitable material) of the button strip), depending on the particular application and desired appearance of the button module and mirror assembly.

Thus, the user input module of the present invention may be readily attached to a bezel portion of a mirror assembly to provide the desired function or control or input/inputs at the bezel portion of the mirror assembly. Optionally, the user input module may be supplied as flexible strips that may be readily received in the recess along the bezel portion and/or attached to the bezel portion, such as at a mirror assembly plant or facility. For example, a variety of user input modules may be received at the mirror assembly manufacturing facility, and the appropriate or selected version of the user input modules may be selected and attached to the appropriate or selected bezel portion to provide the desired or appropriate or selected function to the mirror assembly. The user inputs modules may be supplied with a pressure sensitive adhesive or the like, and may be peeled from a backing element and adhered to the bezel portion (and/or snapped or heat staked or welded or otherwise secured to the bezel portion), with the flexible ribbon cable or the like routed through an aperture in the bezel portion and connected to the circuitry in the mirror assembly. The user input module may be attached to the bezel portion before the bezel portion is attached to the mirror casing, whereby the electrical connector is inserted into the mirror casing and connected to the mirror circuit board before the bezel portion is snapped or otherwise attached to the mirror casing.

Optionally, one set of user inputs may be provided for controlling a universal garage door opening system, such as a vehicle-based garage door opening system of the types described in U.S. Pat. Nos. 7,023,322; 6,396,408; 6,362,771; and 5,798,688, and/or U.S. provisional applications, Ser. No. 60/502,806, filed Sep. 12, 2003; and Ser. No. 60/444,726, filed Feb. 4, 2003, which are hereby incorporated herein by reference in their entireties. Optionally, another input or set of inputs may be provided to control or adjust other accessories or displays of the mirror assembly. For example, the inputs may activate/deactivate/control/adjust a display or other accessory of or associated with the mirror assembly, and/or may adjust or control or select a display function, such as a "compass" function or a "temperature" function or such as a "units" (for example, metric or imperial) selection or display or the like.

Optionally, the buttons or switches or user inputs may be printed or screened with the desired color or pattern of colors (or may be substantially transparent or translucent in areas where no color is printed) to provide the desired appearance for the user input. Optionally, an organic or inorganic light-emitting diode (LED or OLED) or electroluminescent light-emitting (EL; organic or inorganic) junction or element or multiple such elements can be included and located at, or disposed at/behind a particular button, such that successful actuation of a vehicular accessory or feature/function can be indicated to the person pressing the button by that local LED or EL (or any other light-emitting means) indicator element illuminating (and correspondingly, when that particular button is next pressed to turn off that vehicular accessory or feature/function, success may be indicated by the indicator light associated with that particular button turning off).

Any associated back-lighting indicator can have relatively low light emission so that it merely causes that button or a portion thereof to glow at night and so be readily discernible to the driver or to any other occupant of the vehicle without causing any glaring of detrimental effect on the driver's night vision (even if such weak illumination is washed out during daylight, the driver can discern the membrane switch during daytime hours by its distinctive appearance). Optionally, a photo sensor control (such as via a photo transistor or photo diode or photo resistor sensor with allied electrical circuitry) can be included in the mirror assembly or in the vehicle to reduce the intensity emitted by any light-emitting indicator of the user input or button when driving under low ambient conditions such as at dusk or night (less than 200 lux or thereabouts, for example).

Optionally, the user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the mirror assembly may include a display for displaying a compass heading at the reflective element. The display may comprise a display-on-demand transflective display or other types of display as described below. Optionally, the user inputs may also or otherwise comprise user inputs for a telematics system of the vehicle (such as an ONSTAR® system as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,678,614; 6,946,978; 7,004,593; 7,167,796; and/or 7,308,341; and/or PCT Application No. PCT/US03/40611, filed Dec. 19, 2003 and published Jul. 15, 2004 as International Publication No. WO 2004/058540, and/or PCT Application No. PCT/US03/308877, filed Oct. 1, 2003 and published Apr. 15, 2004 as International Publication No. WO 2004/032568, and/or U.S. provisional applications, Ser. No. 61/219,214, filed Jun. 22, 2009; Ser. No. 61/187,069, filed Jun. 15, 2009; Ser. No. 61/117,301, filed Nov. 24, 2008; and Ser. No. 61/105,903, filed Oct. 16, 2008, which are all hereby incorporated herein by reference in their entireties).

In the illustrated embodiments, the reflective element comprises an electro-optic or electrochromic reflective element assembly or cell. The electrochromic reflective element assembly of the electrochromic mirror assembly may utilize the principles disclosed in commonly assigned U.S. Pat. Nos. 6,690,298; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. provisional applications, Ser. No. 61/232,246, filed Aug. 7, 2009; Ser. No. 61/186,204, filed Jun. 11, 2009; and Ser. No. 61/164,593, filed Mar. 30, 2009, which are hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening 44 along the frame portion and/or bezel portion of the mirror assembly) and circuitry and/or an ambient light sensor and circuitry may be provided on one or more circuit boards of the mirror assembly.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 6,690,268; 5,668,663 and/or 5,724,187, and/or in U.S. patent applications, Ser. No. 10/538,724, filed Jun. 13, 2005 and published Mar. 9, 2006 as U.S. Publication No. 2006/0050018; and/or Ser. No. 11/226,628, filed Sep. 14, 2005 and published Mar. 23, 2006 as U.S. Publication No. 2006/0061008; and/or PCT Application No. PCT/US03/29776, filed Sep. 9, 2003 and published Apr. 1, 2004 as International Publication No. WO 2004/026633; PCT Application No. PCT/US03/35381, filed Nov. 5, 2003 and published May 21, 2004 as International Publication No. WO 2004/042457; PCT Application No. PCT/US03/40611, filed Dec. 19, 2003 and published Jul. 15, 2004 as International Publication No. WO 2004/058540; and/or PCT Application No. PCT/US2006/018567, filed May 15, 2006 and published Nov. 23, 2006 as International Publication No. WO 2006/124682, which are all hereby incorporated herein by reference in their entireties.

Although shown and described as having an electro-optic reflective element, the interior rearview mirror assembly of the present invention may optionally have prismatic reflective element. Optionally, the prismatic reflective element may comprise a display on demand or transflective prismatic element (such as described in PCT Application No. PCT/US2006/018567, filed May 15, 2006 and published Nov. 23, 2006 as International Publication No. WO 2006/124682; and/or PCT Application No. PCT/US03/29776, filed Sep. 19, 2003 and published Apr. 1, 2004 as International Publication No. WO 2004/026633; and/or U.S. Pat. No. 7,338,177; and/or U.S. provisional application, Ser. No. 60/525,952, filed Nov. 26, 2003, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, or may be display-on-demand or transflective type displays or other displays, such as the types disclosed in U.S. Pat. Nos. 7,370,983; 7,338,177; 7,274,501; 7,255,451; 7,195,381; 7,184,190; 6,690,268; 5,668,663 and/or 5,724,187, and/or in U.S. patent applications, Ser. No. 10/538,724, filed Jun. 13, 2005 and published Mar. 9, 2006 as U.S. Publication No. 2006/0050018; and/or Ser. No. 11/226,628, filed Sep. 14, 2005 and published Mar. 23, 2006 as U.S. Publication No. 2006/0061008, and/or PCT Application No. PCT/US03/29776, filed Sep. 9, 2003 and published Apr. 1, 2004 as International Publication No. WO 2004/026633; PCT Application No. PCT/US2006/018567, filed May 15, 2006 and published Nov. 23, 2006 as International Publication No. WO 2006/124682; and/or PCT Application No. PCT/US03/35381, filed Nov. 5, 2003 and published May 21, 2004 as International Publication No. WO 2004/042457; and/or U.S. provisional applications, Ser. No. 60/630,061, filed Nov. 22, 2004; Ser. No. 60/667,048, filed Mar. 31, 2005; Ser. No. 60/629,926, filed Nov. 22, 2004; Ser. No. 60/531,838, filed Dec. 23, 2003; Ser. No. 60/553,842, filed Mar. 17, 2004; Ser. No. 60/563,342, filed Apr. 19, 2004; Ser. No. 60/681,250, filed May 16, 2005; Ser. No. 60/690,400, filed Jun. 14, 2005; Ser. No. 60/695,149, filed Jun. 29, 2005; and/or Ser. No. 60/717,093, filed Sep. 14, 2005; Ser. No. 60/730,334, filed Oct. 26, 2005; and/or Ser. No. 60/732,245, filed Nov. 1, 2005, and/or PCT Application No. PCT/US03/40611, filed Dec. 19, 2003 and published Jul. 15, 2004 as International Publication No. WO 2004/058540, which are all hereby incorporated herein by reference in their entireties, or may include or incorporate video displays or the like, such as the types described in PCT Application No. PCT/US03/40611, filed Dec. 19, 2003 and published Jul. 15, 2004 as International Publication No. WO 2004/058540, U.S. Pat. No. 7,370,983, and/or U.S. provisional applications, Ser. No.

60/630,061, filed Nov. 22, 2004; and Ser. No. 60/667,048, filed Mar. 31, 2005, which are hereby incorporated herein by reference in their entireties.

Optionally, the display or display elements may be operable to display vehicle information or accessory status information or the like, without affecting the scope of the present invention. For example, the display and inputs may be associated with a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,824,281; 6,690,268; 6,672,744; 6,386,742; and 6,124,886, and/or PCT Application No. PCT/US03/03012, filed Jan. 31, 2003; PCT Application No. PCT/US03/40611, filed Dec. 19, 2003 and published Jul. 15, 2004 as International Publication No. WO 2004/058540; and/or PCT Application No. PCT/US04/15424, filed May 18, 2004 and published Dec. 2, 2004 as International Publication No. WO 2004/103772, which are hereby incorporated herein by reference in their entireties.

Optionally, the mirror assembly may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 7,249,860; 7,195,381; 6,971,775; 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, which are hereby incorporated herein by reference in their entireties, may be included in or at the mirror assembly. The illumination sources and/or the circuit board may be connected to one or more buttons or inputs for activating and deactivating the illumination sources. Optionally, the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003 and published Apr. 15, 2004 as International Publication No. WO 2004/032568. Optionally, the cap portion and/or the circuit board and/or the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,038,577; 6,882,287; 5,929,786 and/or 5,786,772, and/or U.S. pat. application Ser. No. 11/315,675, filed Dec. 22, 2005, now U.S. Pat. No. 7,720,580; and/or U.S. provisional applications, Ser. No. 60/638,687, filed Dec. 23, 2004; Ser. No. 60/696,953, filed Jul. 6, 2006; and/or Ser. No. 60/784,570, filed Mar. 22, 2006, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; Ser. No. 61/238,862, filed Sep. 1, 2009; Ser. No. 61/180,257, filed May 21, 2009; Ser. No. 61/174,596, filed May 1, 2009; and/or Ser. No. 61/156,184, filed Feb. 27, 2009, and/or U.S. pat. applications, Ser. No. 11/105,757, filed Apr. 14, 2005, now U.S. Pat. No. 7,526,103; and/or Ser. No. 11/239,980, filed Sep. 30, 2005, now U.S. Pat. No. 7,881,496, a slide out or extendable/retractable vide device or module, such as described in U.S. Pat. No. 7,370,983; and U.S. provisional applications, Ser. No. 60/630,061, filed Nov. 22, 2004; and/or Ser. No. 60/667,048, filed Mar. 31, 2005; and/or PCT Application No. PCT/US03/40611, filed Dec. 19, 2003, and published Jul. 15, 2004 as International Publication No. WO 2004/058540, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or an ONSTAR® system and/or any other accessory or circuitry or the like (with all of the above-referenced patents and PCT and U.S. patent applications being commonly assigned, and with the disclosures of the referenced patents and patent applications being hereby incorporated herein by reference in their entireties).

Optionally, the mirror assembly may accommodate or be associated with other accessories or circuitry or the like as well, such as a rain sensor or imaging device or the like. For example, the mirror assembly may include a mounting portion (such as the types described in U.S. patent application Ser. No. 11/226,628, filed Sep. 14, 2005 and published Mar. 23, 2006 as U.S. Publication No. 2006/0061008; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference in their entireties), and may include a rain sensor or the like and may position the rain sensor against the windshield, such as described in U.S. Pat. Nos. 6,250,148; 6,341,523; 6,516,664; 6,968,736; 6,824,281; and/or 7,188,963, which are all hereby incorporated herein by reference in their entireties. Optionally, the mirror assembly may include an imaging device, such as an imaging array sensor for imaging systems of the types described in U.S. Pat. Nos. 7,339,149; 7,038,577; 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 11/315,675, filed Dec. 22, 2005, now U.S. Pat. No. 7,720,580; and/or U.S. provisional application, Ser. No. 60/638,687, filed Dec. 23, 2004, which are all hereby incorporated herein by reference in their entireties.

Optionally, the inputs or switches or buttons may comprise other types of switches or buttons, such as touch or proximity sensing switches, such that the user may only have to lightly touch the input or approach the input with his or her finger. For example, the user inputs may comprise touch or proximity switches of the types described in PCT Application No. PCT/US03/40611, filed Dec. 19, 2003 and published Jul. 15, 2004 as International Publication No. WO 2004/058540; and/or U.S. Pat. Nos. 7,360,932; 7,255,451; 7,249,860; 7,224,324; 6,001,486; 6,310,611; 6,320,282; and 6,627,918; and/or U.S. patent application Ser. No. 10/956, 749, filed Oct. 1, 2004, now U.S. Pat. No. 7,446,924, which are hereby incorporated herein by reference in their entireties, or the inputs may comprise other types of buttons or switches, such as those described in U.S. Pat. No. 7,253,723, which is hereby incorporated herein by reference in its entirety, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

The bezel portion may attach to the rear casing of the mirror to assemble the reflective element to the rear casing. The rear casing may comprise any type of mirror casing and may house or contain electronic circuitry therein. Optionally, the rear casing portion comprise a plastic molded cap or cap portion, such as the types described in U.S. Pat. No. 7,289,037; and U.S. provisional applications, Ser. No. 60/471,546, filed May 19, 2003; Ser. No. 60/525,537, filed Nov. 26, 2003; and Ser. No. 60/556,259, filed Mar. 25, 2004, and in PCT Application No. PCT/US04/15424, filed May 18, 2004, and published Dec. 2, 2004 as International Publication No. WO 2004/103772, which are hereby incorporated herein by reference in their entireties. Optionally, the casing and/or bezel portion may comprise a casing or bezel portion utilizing aspects of the mirror assemblies described in U.S. provisional applications, Ser. No. 61/249, 300, filed Oct. 7, 2009; Ser. No. 61/187,112, filed Jun. 15, 2009; and/or Ser. No. 61/172,022, filed Apr. 23, 2009, which are hereby incorporated herein by reference in their entireties.

Changes and modification in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
   a reflective element, wherein said reflective element comprises a substrate having a front surface that faces generally toward a driver of a vehicle when said interior rearview mirror assembly is normally mounted in the vehicle;
   a housing portion positioned at the perimeter of said reflective element, wherein said housing portion extends generally along at least a portion of a perimeter region of said reflective element, and wherein said housing portion has an exterior surface that faces generally toward the driver of the vehicle when said interior rearview mirror assembly is normally mounted in the vehicle, said housing portion having a recess established at said exterior surface and spaced from said front surface of said reflective element that is viewable by the driver of the vehicle when said interior rearview mirror assembly is normally mounted in the vehicle;
   a user input module comprising at least one user input that is actuatable by a user;
   wherein said user input module comprises backlighting operable to backlight said at least one user input;
   wherein said user input module is at least partially received in said recess at said housing portion; and
   wherein said user input module is configured to snap attach at said housing portion when at least partially received in said recess at said housing portion.

2. The interior rearview mirror assembly of claim 1, wherein said recess is established at least partially above a level that corresponds to a lower edge region of said reflective element so that said user input module is disposed in front of and at least partially overlaps said lower edge region of said reflective element.

3. The interior rearview mirror assembly of claim 1, wherein said housing portion at which said user input module is disposed comprises a bezel portion of said interior rearview mirror assembly.

4. The interior rearview mirror assembly of claim 1, wherein said housing portion at which said user input module is disposed comprises a lower bezel portion of said interior rearview mirror assembly.

5. The interior rearview mirror assembly of claim 1, wherein said user input module has an exterior surface that is curved to generally correspond with said exterior surface of said housing portion that is adjacent to said recess and said user input module when said user input module is snap attached at said housing portion, and wherein said exterior surfaces of said user input module and said housing portion cooperate to define a generally continuous trim portion along the at least a portion of said perimeter region of said reflective element.

6. The interior rearview mirror assembly of claim 1, wherein said user input module comprises an electrical connector that passes through an aperture formed through said housing portion at said recess, said electrical connector electrically connecting circuitry of said user input module to circuitry within said interior rearview mirror assembly.

7. The interior rearview mirror assembly of claim 1, wherein said user input module comprises a flexible user input module that includes circuitry at least partially established on a flexible circuit element.

8. The interior rearview mirror assembly of claim 1, wherein said user input module comprises a flexible keypad disposed over electronic circuitry of said user input module and wherein said electronic circuitry is actuated by a user pressing said flexible keypad.

9. The interior rearview mirror assembly of claim 1, wherein said at least one user input comprises a plurality of user inputs disposed along said user input module and wherein said user input module comprises a plurality of actuating elements associated with respective ones of said plurality of user inputs.

10. An interior rearview mirror assembly for a vehicle, said interior rearview mirror assembly comprising:

a reflective element, wherein said reflective element comprises a substrate having a front surface that faces generally toward a driver of a vehicle when said interior rearview mirror assembly is normally mounted in the vehicle;

a housing portion positioned at the perimeter of said reflective element, wherein said housing portion extends generally along at least a portion of a perimeter region of said reflective element, and wherein said housing portion has an exterior surface that faces generally toward the driver of the vehicle when said interior rearview mirror assembly is normally mounted in the vehicle, said housing portion having a recess established at said exterior surface and spaced from said front surface of said reflective element that is viewable by the driver of the vehicle when said interior rearview mirror assembly is normally mounted in the vehicle;

a user input module comprising a plurality of user inputs;

wherein said plurality of user inputs are individually actuatable by a user;

wherein said user input module comprises backlighting operable to backlight said plurality of user inputs;

wherein said user input module is at least partially received in said recess at said housing portion;

wherein said user input module is configured to snap attach at said housing portion when at least partially received in said recess at said housing portion; and wherein said user input module comprises an electrical connector that passes through an aperture formed through said housing portion at said recess, said electrical connector electrically connecting circuitry of said user input module to circuitry within said interior rearview mirror assembly.

11. The interior rearview mirror assembly of claim 10, wherein said recess is established at least partially above a level that corresponds to a lower edge region of said reflective element so that said user input module is disposed in front of and at least partially overlaps said lower edge region of said reflective element.

12. The interior rearview mirror assembly of claim 10, wherein said housing portion at which said user input module is disposed comprises a bezel portion of said interior rearview mirror assembly.

13. The interior rearview mirror assembly of claim 10, wherein said user input module has an exterior surface that is curved to generally correspond with said exterior surface of said housing portion that is adjacent to said recess and said user input module when said user input module is snap attached at said housing portion, and wherein said exterior surfaces of said user input module and said housing portion cooperate to define a generally continuous trim portion along the at least a portion of said perimeter region of said reflective element.

14. The interior rearview mirror assembly of claim 10, wherein said user input module comprises a flexible user input module that includes circuitry at least partially established on a flexible circuit element.

15. The interior rearview mirror assembly of claim 10, wherein said user input module comprises a flexible keypad and wherein user inputs are actuated by a user pressing said flexible keypad.

16. An interior rearview mirror assembly for a vehicle, said interior rearview mirror assembly comprising:

a reflective element, wherein said reflective element comprises a substrate having a front surface that faces generally toward a driver of a vehicle when said interior rearview mirror assembly is normally mounted in the vehicle;

a housing portion positioned at the perimeter of said reflective element, wherein said housing portion extends generally along at least a portion of a perimeter region of said reflective element, and wherein said housing portion has an exterior surface that faces generally toward the driver of the vehicle when said interior rearview mirror assembly is normally mounted in the vehicle, said housing portion having a recess established at said exterior surface and spaced from said front surface of said reflective element that is viewable by the driver of the vehicle when said interior rearview mirror assembly is normally mounted in the vehicle;

a user input module comprising at least one user input that is actuatable by a user;

wherein said user input module comprises backlighting operable to backlight said at least one user input;

wherein said user input module comprises a flexible user input module that includes circuitry at least partially established on a flexible circuit element;

wherein said user input module is at least partially received in said recess at said housing portion; and wherein said user input module is configured to snap attach at said housing portion when at least partially received in said recess at said housing portion; and wherein said user input module has an exterior surface that is curved to generally correspond with said exterior surface of said housing portion that is adjacent to said recess and said user input module when said user input module is snap attached at said housing portion, and wherein said exterior surfaces of said user input module and said housing portion cooperate to define a generally continuous trim portion along the at least a portion of said perimeter region of said reflective element.

17. The interior rearview mirror assembly of claim 16, wherein said recess is established at least partially above a level that corresponds to a lower edge region of said reflective element so that said user input module is disposed in front of and at least partially overlaps said lower edge region of said reflective element.

18. The interior rearview mirror assembly of claim 16, wherein said housing portion at which said user input module is disposed comprises a bezel portion of said interior rearview mirror assembly.

19. The interior rearview mirror assembly of claim 16, wherein said user input module comprises an electrical connector that passes through an aperture formed through said housing portion at said recess, said electrical connector electrically connecting circuitry of said user input module to circuitry within said interior rearview mirror assembly.

20. The interior rearview mirror assembly of claim 16, wherein said at least one user input comprises a plurality of user inputs disposed along said user input module and wherein said user input module includes a plurality of actuating elements associated with respective ones of said plurality of user inputs, and wherein said user input module comprises a flexible keypad disposed over said actuating elements and wherein said actuating elements are individually actuated by a user pressing portions of said flexible keypad.

* * * * *